(12) United States Patent
Bohn

(10) Patent No.: US 7,068,257 B1
(45) Date of Patent: Jun. 27, 2006

(54) IMAGING LENS WITH INTEGRAL LIGHT SOURCE HOLDER

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 10/417,173

(22) Filed: Apr. 17, 2003

Related U.S. Application Data

(63) Continuation-in-part of application No. 10/382,867, filed on Mar. 7, 2003, now Pat. No. 7,009,598, and a continuation-in-part of application No. 10/382,931, filed on Mar. 7, 2003.

(51) Int. Cl.
    *G09G 5/08* (2006.01)
(52) U.S. Cl. ...................... 345/166; 345/163
(58) Field of Classification Search ......... 345/163–167
    See application file for complete search history.

(56) References Cited

U.S. PATENT DOCUMENTS

| | | | |
|---|---|---|---|
| 5,517,211 A * | 5/1996 | Kwang-Chien ............. | 345/166 |
| 5,578,813 A | 11/1996 | Allen et al. | |
| 5,686,720 A | 11/1997 | Tullis | |
| 5,943,233 A | 8/1999 | Ebina et al. | |
| 6,256,016 B1 | 7/2001 | Piot et al. | |
| 6,421,045 B1 | 7/2002 | Venkat et al. | |
| 6,424,407 B1 | 7/2002 | Kinrot et al. | |
| 6,462,330 B1 | 10/2002 | Venkat et al. | |
| 6,486,873 B1 | 11/2002 | McDonough et al. | |
| 2003/0006965 A1 | 1/2003 | Bohn | |
| 2003/0142075 A1 | 7/2003 | Chin | |
| 2003/0142078 A1 | 7/2003 | Chin | |
| 2003/0201951 A1 | 10/2003 | Chin | |
| 2004/0084610 A1 | 5/2004 | Leong et al. | |
| 2004/0149894 A1 | 8/2004 | Tschimen et al. | |

FOREIGN PATENT DOCUMENTS

| | | | |
|---|---|---|---|
| JP | 08137613 A | * | 5/1996 |
| KR | 2002050803 A | * | 6/2002 |

* cited by examiner

Primary Examiner—Alexander Eisen
(74) Attorney, Agent, or Firm—Banner & Witcoff, Ltd.

(57) ABSTRACT

An imaging lens unit has an imaging lens and an integral holder for a light source such as a LED. The imaging lens unit can include a body portion, with the imaging lens being formed as an integral part of the body portion, together with a light source support fixture also formed as an integral part of the body portion. The support fixture supports a light source in a desired spatial relationship with respect to the imaging lens, and may have an opening for insertion of the light source into the support fixture along an installation axis. The fixture may be configured to prevent removal of the light source along substantially all other axes. The light source support fixture can be configured to support and retain the light source without additional cooperating structure. The invention further includes a computer mouse having an imaging lens unit with an integral light source support.

38 Claims, 23 Drawing Sheets

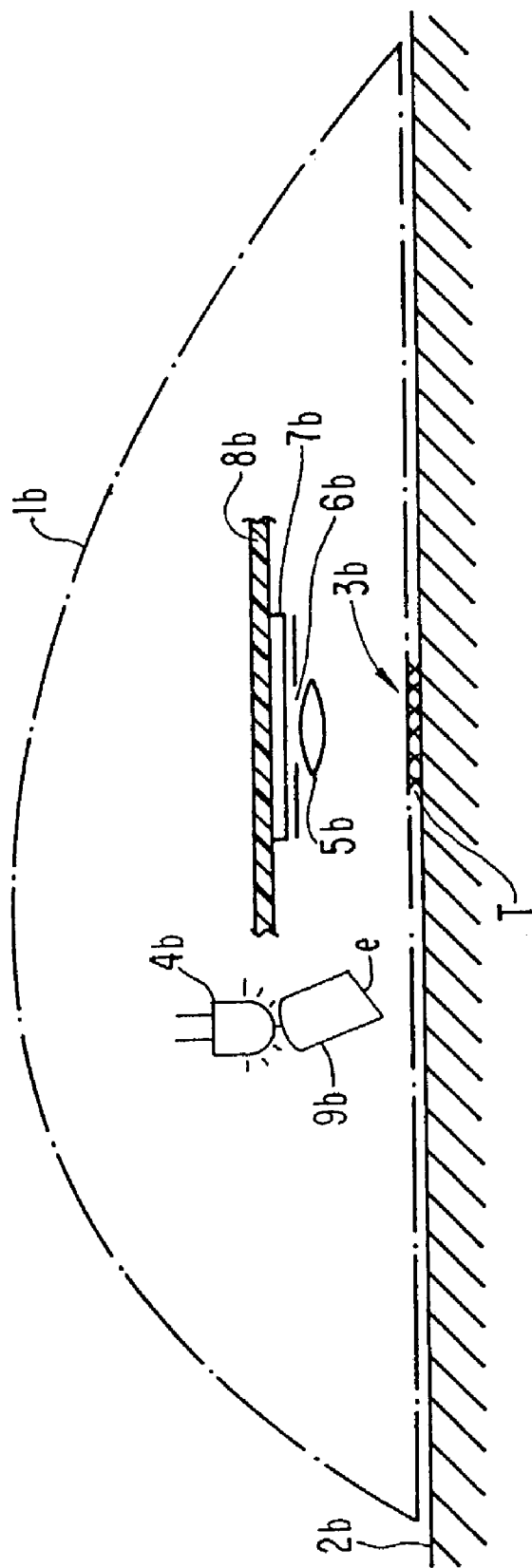

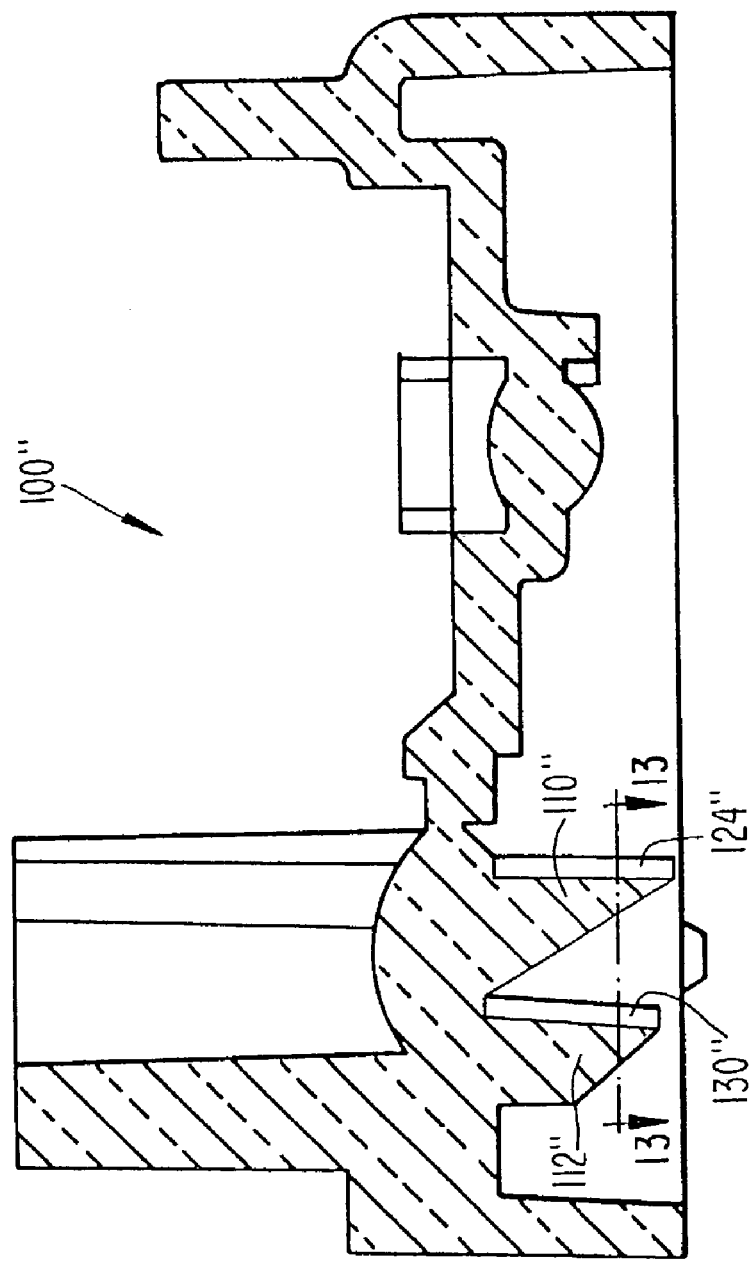

IMAGING LENS WITH INTEGRAL LIGHT SOURCE HOLDER

CROSS-REFERENCES TO RELATED APPLICATIONS

This application is a continuation-in-part of the U.S. patent application titled "Multiple Channel Light Guide for Optically Tracking Pointing and Input Devices," filed on Mar. 7, 2003 and having Ser. No. 10/382,867 now U.S. Pat. No. 7,009,598, and is also a continuation-in-part of the U.S. patent application titled "Computer Input Device with Multi-Purpose Light Guide," filed on Mar. 7, 2003 and having Ser. No. 10/382,931.

FIELD OF THE INVENTION

This invention relates generally to optical components usable in optically-tracking pointing and input devices such as computer mice. More particularly, this invention relates to an imaging lens having an integral holder for supporting and positioning a light source.

BACKGROUND OF THE INVENTION

Computer input and other pointing devices, such as electronic mice, convert physical movement into movement of a cursor or other image across a computer screen. Previously, many such devices utilized mechanically driven encoder wheels and other moving components to detect direction and magnitude of motion, and to then convert that information into data for communication to a computer or other device. Optical surface tracking offers an improved method of motion detection. Instead of encoder wheels rotated by a ball rolling across a surface, an array of photo-sensitive elements generates an image of a desktop (or other supporting surface) portion when light from an associated illumination source (such as a light emitting diode) reflects from the desktop or other surface. Subsequent images are compared, and based on the correlation between images, the magnitude and direction of mouse motion may be determined. Exemplary optical tracking systems, and associated signal processing techniques, include those disclosed in commonly owned U.S. Pat. Nos. 6,172,354, 6,303,924 and 6,373,047.

FIG. 1A schematically shows various components of an existing optical tracking system in a computer mouse 1a. Mouse 1a (shown in phantom lines) moves across a surface 2a such as a desk top or a table. A region 3a of the bottom surface of mouse 1a is either transparent or open so that light may reach a portion of the surface 2a (the "target area" T) and be reflected back to an image sensor 7a. A light source 4a inside of mouse 1a, which is typically a LED, is selectively turned on and off so as to controllably illuminate the target area T. Light from LED 4a reflects from the target area and is collected and focused by a lens 5a through an aperture 6a. Light passing through aperture 6a strikes a photo-sensing surface of an image sensor 7a. Image sensor 7a then forms (sometimes in connection with other components) an image of the target area T (or a portion thereof). Typically, image sensor 7a is attached to a Printed Circuit Board (PCB) 8a, only a portion of which is represented in FIG. 1A. In alternative configurations, a light guide directs light from a LED to the target area. One such configuration is shown in FIG. 1B, in which components 1b–8b are generally similar to components 1a–8a of FIG. 1A. In the configuration of FIG. 1B, however, light from LED 4b is transmitted to the target area T via light guide 9b. Typically, light guide 9b is formed from light-transmissive material such as glass or plastic. The light from LED 4b enters light guide 9b and reflects from the internal surfaces of the material, and then exits from an exit face e to illuminate the target area.

Although an improvement over mechanically-tracking types of motion sensing systems, optically-tracking systems present a new set of challenges. The light source, lens, image sensor and other components must be properly positioned with respect to one another. Permissible tolerances for this positioning are generally closer than tolerances associated with assembly of mechanical tracking components. Mismatches between mating components can cause imaging errors which degrade overall system performance. It is therefore often desirable to minimize the number of components which must be assembled. There are also advantages in minimizing the number of structural components beyond reduction of tolerance stack-ups. For example, fewer components can lead to reduction in assembly costs.

Various structures for holding a lens and at least partially supporting a LED (or other light source) have been developed. Commonly-owned U.S. Pat. No. 6,421,045 describes a lens carrier having a lens formed within a well of an annular bearing surface. The carrier also has a LED rest formed on the underside of the carrier. However, the structure described by the U.S. Pat. No. 6,421,045 patent cooperates with another structure (or structures) to retain and properly align the LED.

SUMMARY OF THE INVENTION

The present invention addresses many of the challenges described above. In particular, the present invention provides an imaging lens unit having an imaging lens and an integral holder for a light source such as a LED. In one embodiment, the imaging lens unit includes a body portion, with the imaging lens being formed as an integral part of the body portion. A light source support fixture is also formed as an integral part of the body portion. The support fixture is configured to support a light source in a desired spatial relationship with respect to the imaging lens. The support fixture also has an opening for insertion of the light source into the support fixture along an installation axis; the fixture is further configured to prevent removal of the light source along substantially all other axes. In another embodiment, a light source support is configured to receive the light source and to support and retain the light source (without additional cooperating structure) in a desired spatial relationship with respect to the imaging lens. The invention further includes a computer mouse having an imaging lens unit with an integral light source support. Other features and advantages of the invention are described herein and in the accompanying drawings, or will be apparent to persons skilled in the art once provided with the following description and accompanying drawings.

BRIEF DESCRIPTION OF THE DRAWINGS

FIG. 1B is a schematic drawing of one existing arrangement for illuminating a target area.

FIG. 12 is a cross section of an optical structure according to another embodiment of the invention.

DETAILED DESCRIPTION OF THE PREFERRED EMBODIMENTS

The invention is described using an optically-tracking computer mouse as an example of a device into which the invention may be incorporated. However, the invention is not limited to computer mice.

Figure 1A:
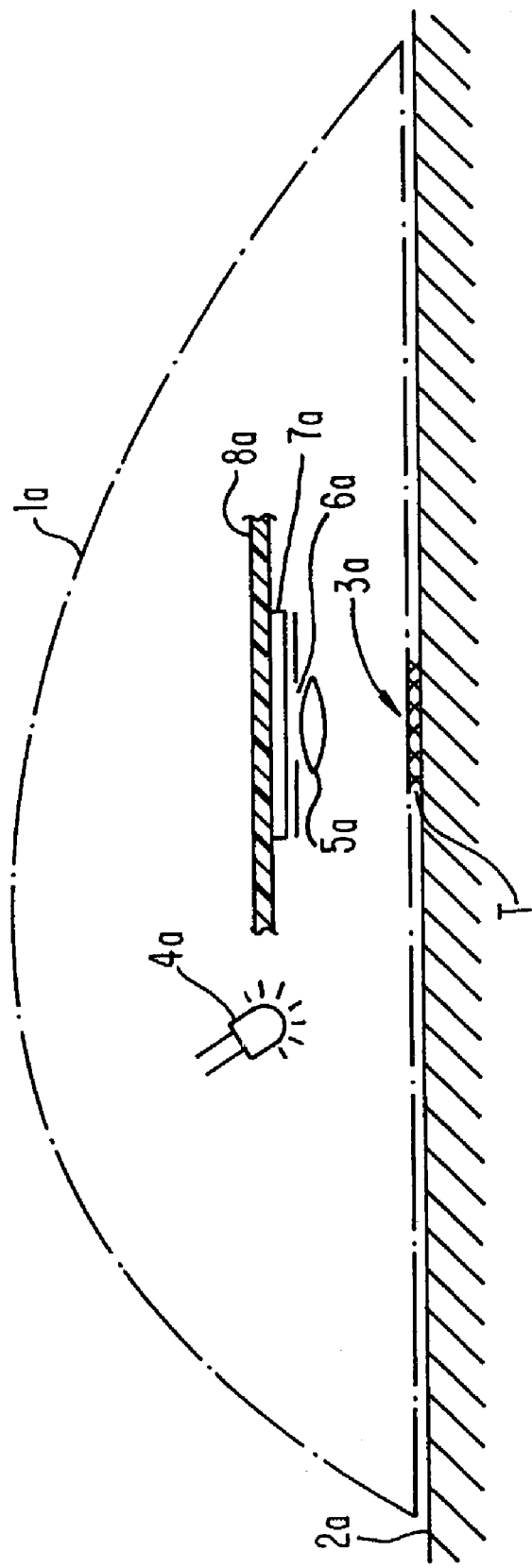
FIG. 1A is schematic drawing of components in an existing optically-tracking computer mouse.
Figure 2:
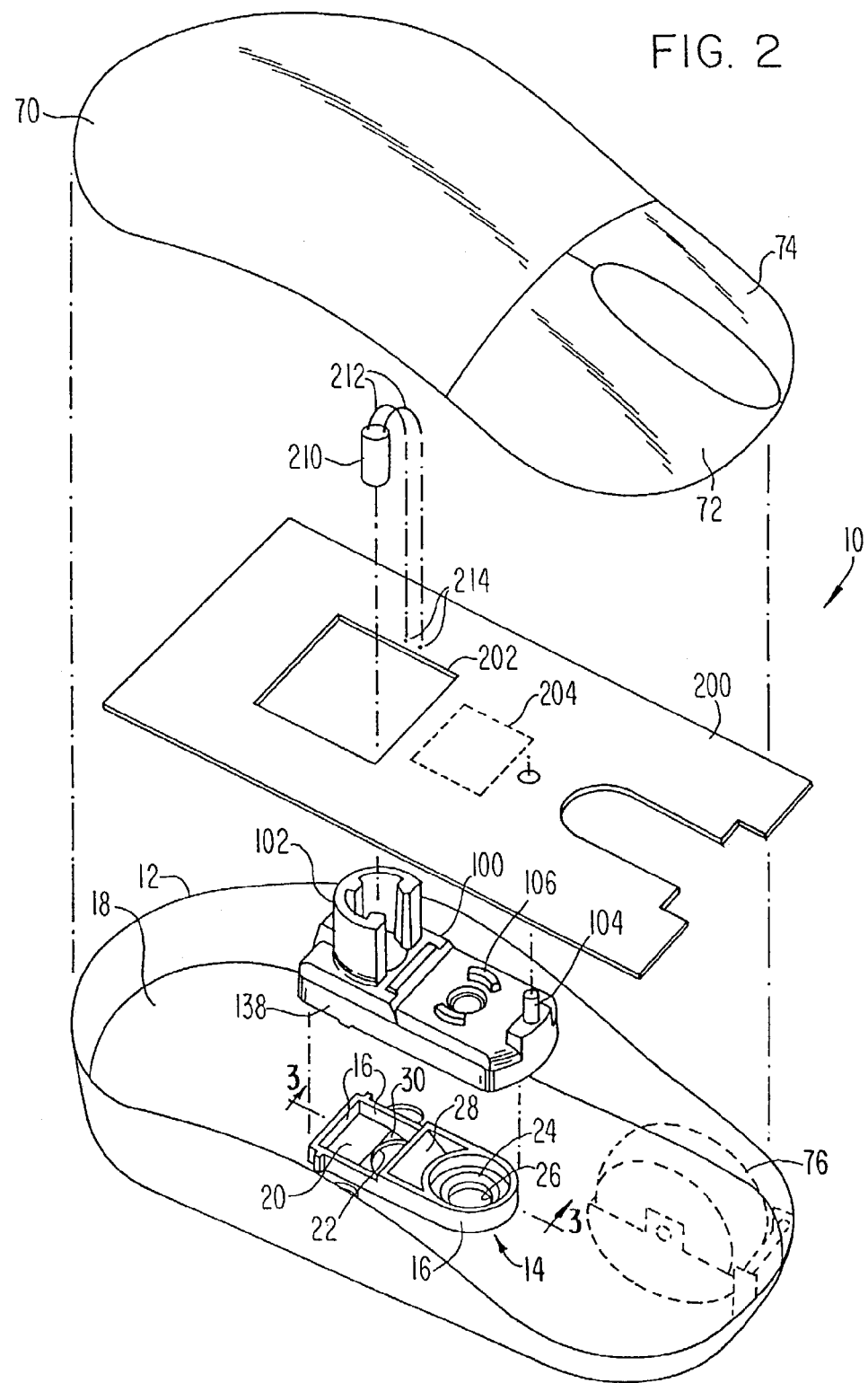
FIG. 2 is an "exploded" view of a computer mouse incorporating an optical structure according to one embodiment of the invention.
Figure 3:
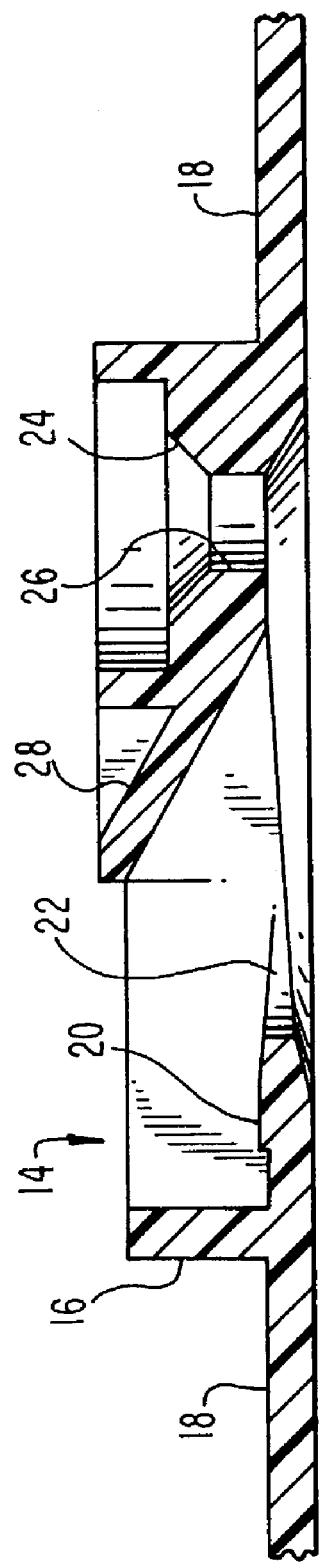
FIG. 3 is a cross section taken along lines 3—3 of FIG. 2.

FIG. 2 is an "exploded" view of portions of a computer mouse 10 incorporating an optical structure 100 according to one preferred embodiment of the invention. Housing base 12 is configured to rest upon and move over a desk top or other tracking surface, as well as to support and contain other components. Housing base 12 may be molded from ABS (acrylonitrile butadiene styrene) or other suitable material. Formed in the interior of housing base 12 is an access/support structure 14. FIG. 3 is a cross section of access/support structure 14 taken along line 3—3 in FIG. 2. Access/support structure 14 includes walls 16 extending upward from the interior bottom surface 18 of housing base 12. Access/support structure 14 includes a first well 20. Located in the bottom of first well 20 is a transmission hole 22. Located at the other end of access/support structure 14 is a second well 24. Located in the center of second well 24 is a receiving hole 26. Separating wells 20 and 24 is a baffle 28. Mouse 10 also has an upper housing 70, which may have one or more buttons 72, 74, an opening for a scroll wheel 76, and other mechanisms for receiving user input. Mouse 10 would typically include numerous other components such as a battery (if mouse 10 is wireless), various connectors, cabling, etc. So as not to obscure FIG. 2 with unnecessary detail, these additional components are not shown, but would be understood as present by persons skilled in the art.

Optical structure 100 fits over access/support structure 14. Located on one end of optical structure 100 and extending upward is LED support 102. Also located on optical structure 100 and extending upward may be a positioning post 104 and spacer/shield wall 106. As shown in FIG. 2, positioning post 104 cooperates with a hole in printed circuit board (PCB) 200 to position and stabilize optical structure 100 with respect to PCB 200. Spacer/shield wall 106 may also be formed so as to position and stabilize optical structure 100 with respect to PCB 200. In alternate embodiments, either or both of positioning post 104 and spacer/shield wall 106 may be absent. LED support 102 extends through an opening 202 in PCB 200. Image sensor 204 is positioned adjacent to opening 202 on the underside of PCB 200. When assembled, LED 210 is positioned vertically downward inside of LED support 102 (see FIG. 7). Leads 212 from LED 210 are soldered to PCB connection points 214. Different types of LEDs may be used in connection with the invention. In one preferred embodiment, a T1-¾ size LED producing light at approximately 630 nm is used. Such a LED is available from Agilent Technologies of Palo Alto, Calif. having part number HLMP-EG24-RU000. LEDs producing light at other wavelengths and having other or different features may also be used. Light sources other than LEDs could also be used.

Figure 4:
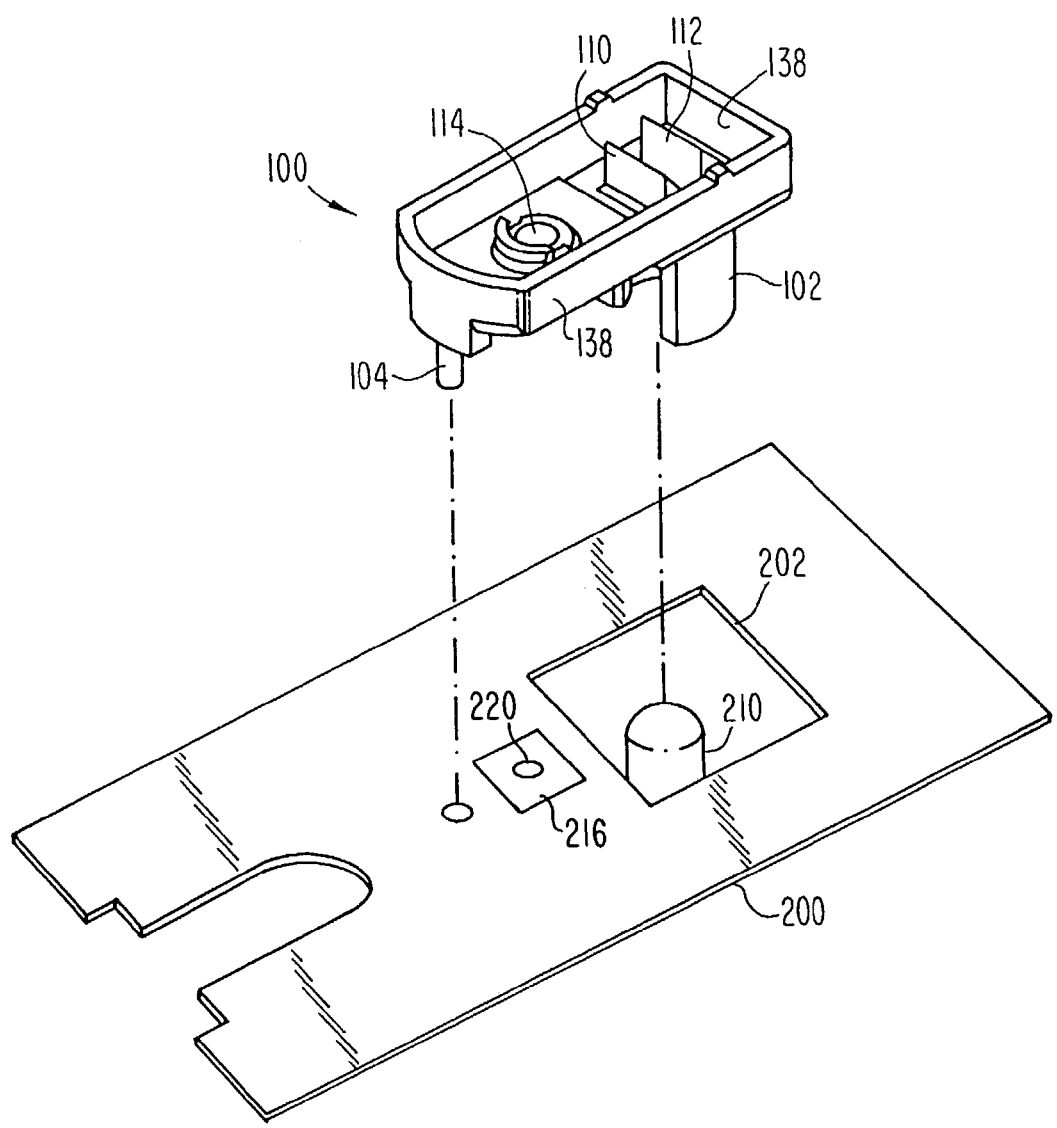
FIG. 4 is an inverted "exploded" partial view of the computer mouse of FIG. 2.
Figure 7:
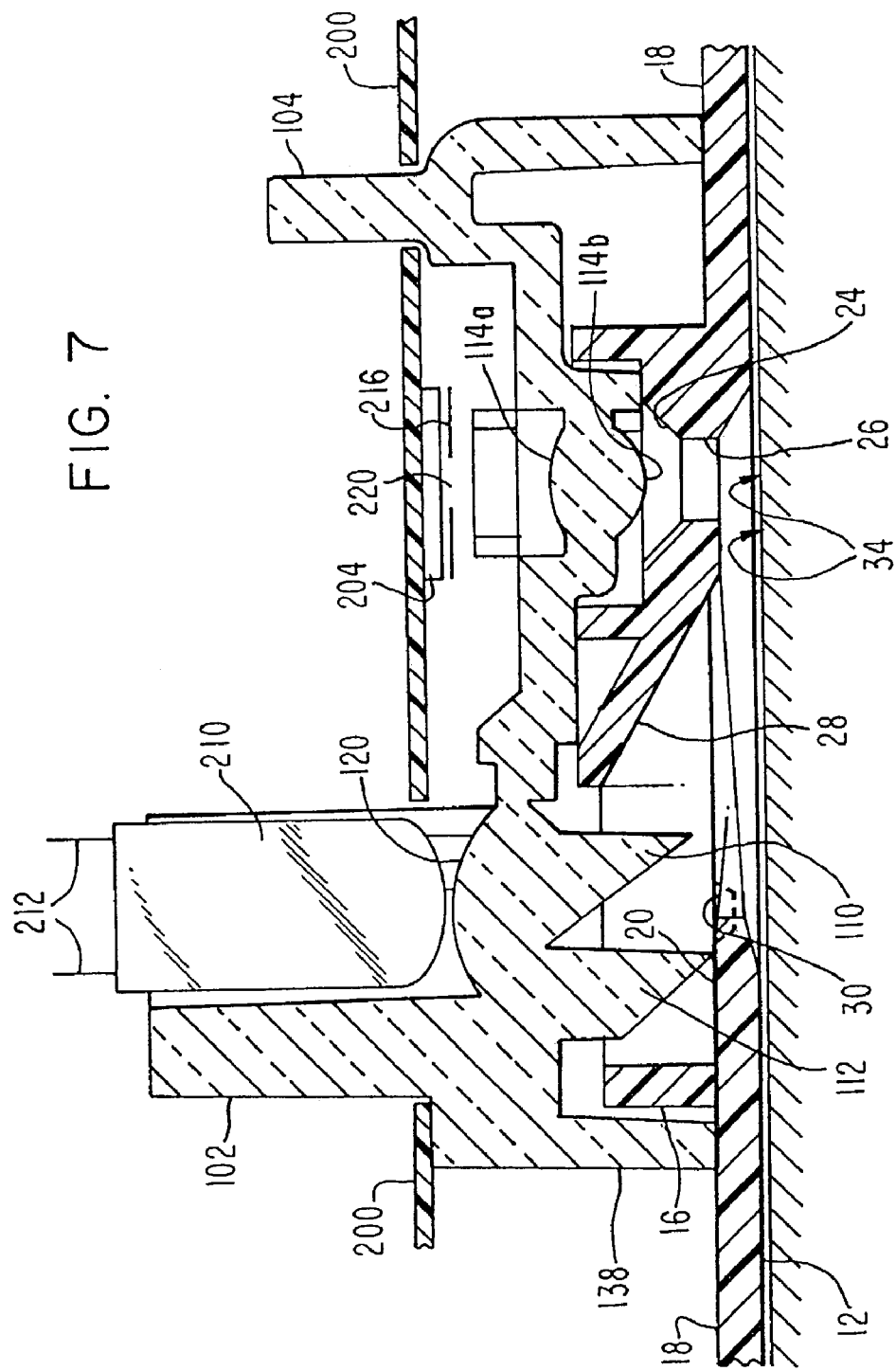
FIG. 7 is a cross section of an optical structure shown in FIG. 6 when assembled with other components.

As can be seen in FIGS. 2, 4 and 7, LED 210 is completely contained within LED support 102. LED support 102 maintains LED 210 in a desired position without reliance upon other structural components.

Image sensor 204 contains multiple light sensitive elements and can be used to create electrical signals representing an image. In one preferred embodiment, image sensor 204 is an integrated circuit containing both the light sensitive elements and the circuitry for converting the received light into electrical signals. On such device is described in commonly-owned U.S. patent application Ser. No. 10/305,062, titled "Photo-Sensor Array for Motion Detection" and filed Nov. 27, 2002, incorporated by reference herein. Other image sensor integrated circuits are known in the art and are commercially available. One such sensor is available from Agilent Technologies and has part number ADNS-2620. Other image sensing components are described in the aforementioned U.S. Pat. Nos. 6,172,354, 6,303,924 and 6,373,047 (including documents referenced therein). In other embodiments, image sensor 204 may only contain light sensitive components, with the associated conversion circuitry located elsewhere.

FIG. 4 is similar to FIG. 2, but inverted so as to expose the underside of PCB 200 and optical structure 100. FIG. 4 shows LED 210 in place, and omits housing base 12. Aperture plate 216 covers image sensor 204 (not shown in FIG. 4) and has an aperture 220 formed therein. Light enters aperture 220 and strikes photo-sensitive regions of image sensor 204. In other embodiments, aperture plate 216 could be situated on the underside of PCB 200 and image sensor 204 on the upper side of PCB 200, with an opening in PCB 200 between image sensor 204 and aperture plate 216. Aperture plate 216 may be integrated with image sensor 204 prior to attachment to PCB 200, may be formed as an integral component of the image sensor, or may be attached as a separate piece to PCB 200. Exposed on the underside of optical structure 100 are two light guide channels 110 and 112, which are further described below. Also shown on the underside of optical structure 100 is imaging lens 114 (also described below).

Figure 5:
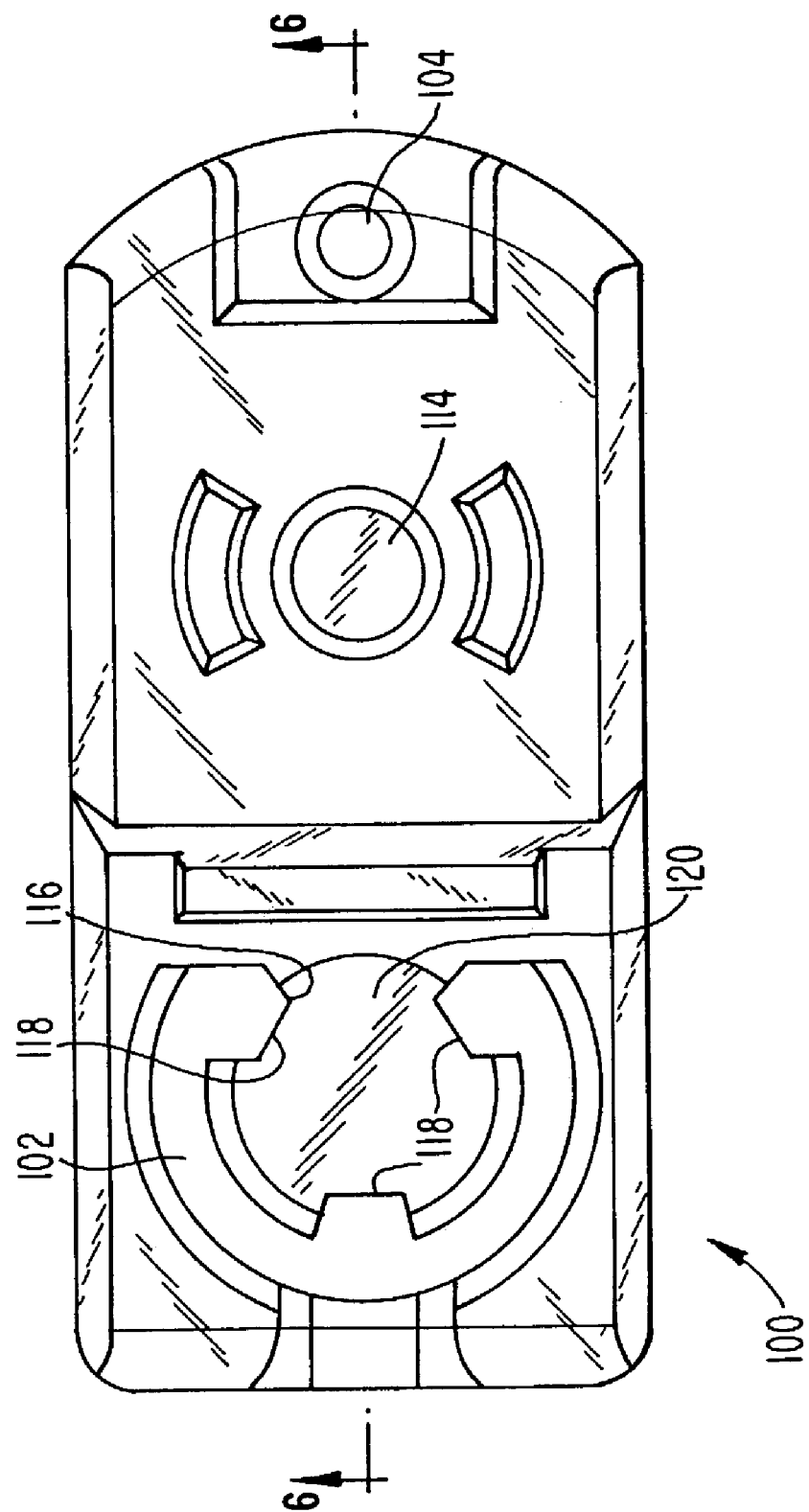
FIG. 5 is a top view of an optical structure according to one embodiment of the invention.
Figure 6:
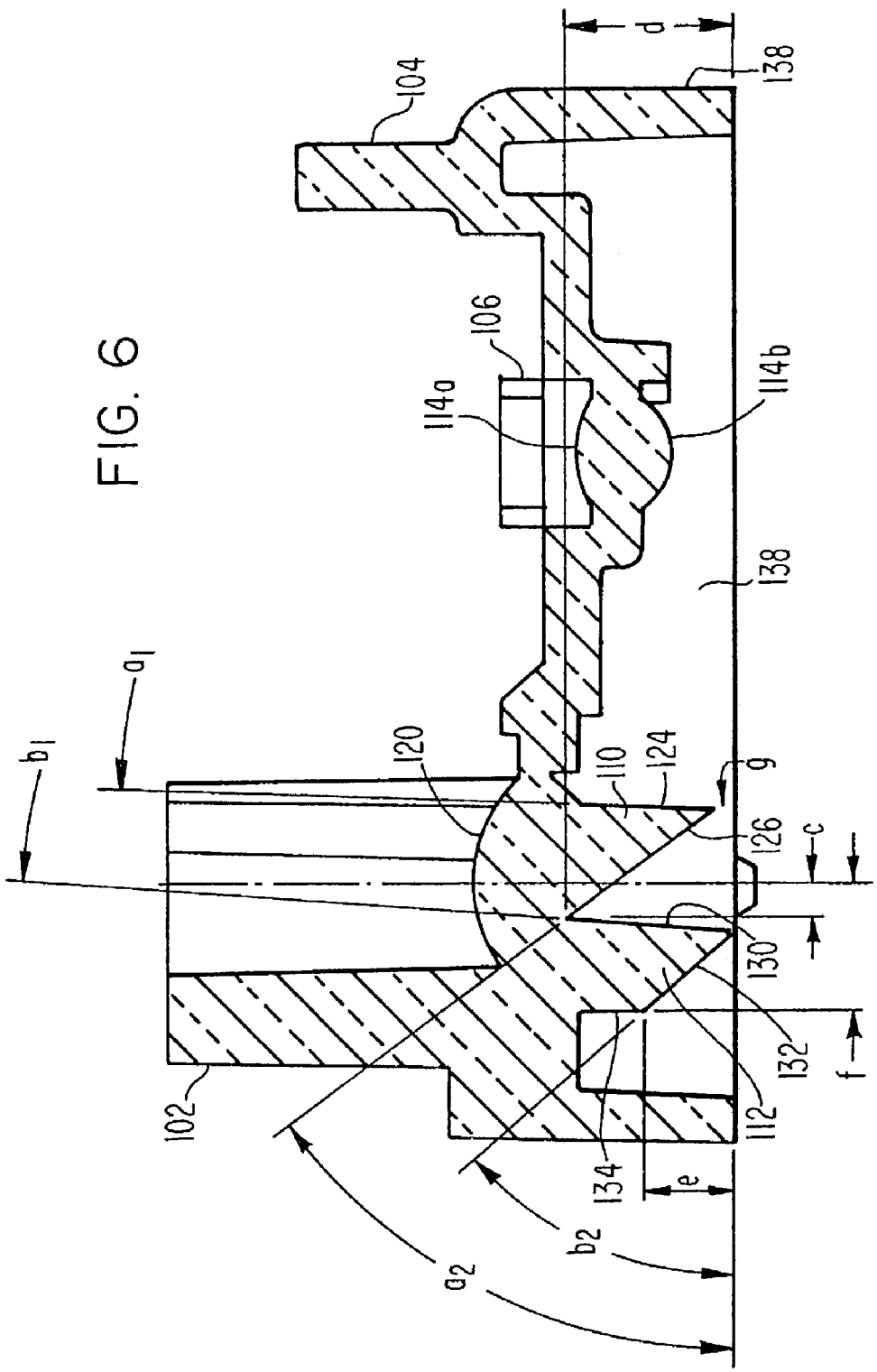
FIG. 6 is a cross section taken along lines 6—6 of FIG. 5.

FIGS. 5 and 6 show optical structure 100 in more detail. FIG. 5 is a top view of optical structure 100. LED support 102 is formed as a hollow cylinder, and has a vertical opening 116 on one side. Upon assembly, LED 210 is positioned inside the cylinder of LED support 102 and pointing vertically downward. Three vertical locating ridges 118 are formed inside of LED support 102 and serve to align LED 210. In some embodiments, locating ridges 118 are sized such that a press fit would exist between the outer surface of LED 210 and ridges 118. In particular, use of certain more flexible materials for optical structure 100 (such as, e.g., polycarbonate) would facilitate a press fit. If optical structure 100 is instead formed from a more brittle material (such as, e.g., polystyrene), ridges 188 could be sized to provide a clearance fit. Even in the case of a clearance fit, however, LED 210 would still be supported on all sides. LED 210 could only be removed by withdrawal along an axis substantially coincident with the axis along which LED 210 is inserted into the interior cavity of support 102. In particular, the opening 116 between the rightmost two ridges 118 in FIG. 5 is not sufficiently wide to allow LED 210 to pass through.

Formed in the bottom of LED support 102 is a collection lens 120. Collection lens 120 collects light emitted by LED 210 and directs that light to the tracking surface target area via channels 110 and 112. Also formed in optical structure 100 is an imaging lens 114. Imaging lens 114 collects and focuses light reflected from a target area and directs that light through aperture 220 in aperture plate 216. LED support 102 maintains LED 210 in a fixed position relative to imaging lens 114.

FIG. 6 is a cross section of optical structure 100 taken along lines 6—6 of FIG. 5. Collection lens 120 and channels 110 and 112 form a light guide for directing light from LED 210 (when placed in support 102) to a target area. This light guide receives light from LED 210, divides that light between two channels 110 and 112 having stepped front faces (as described below), and rejoins that light by directing it to the target area. Channels 110 and 112 are located on the underside of LED support 102. Front channel 110 has a front face 124 and a rear face 126. Rear face 126 forms a Total Internal Reflecting (TIR) surface. A portion of the light emitted by LED 210 and entering collection lens 120 is diverted to channel 110. This diverted light is then reflected by the TIR surface and exits channel 110 through front face 124. Rear channel 112 has a front face 130, a rear face 132, and a rear vertical face 134. Rear face 132 also forms a TIR surface. A portion of the light from LED 210 entering collection lens 120 is diverted to channel 112. This portion of the light is reflected by the TIR surface of rear face 132 and exits channel 112 through front face 130. Front faces 124 and 130 form a stepped arrangement relative to one another. In other words, front faces 124 and 130 lie in generally parallel planes, but are offset by an amount g by which the rear channel 112 extends further downward than front channel 110. Channels 110 and 112 are separated by a space bounded by the rear face 126 of front channel 110 and the front face 130 of rear channel 112. This separation between the channels is filled with a material (air in this case) that is dissimilar to that of the channels. In a preferred embodiment, channels 110 and 112 have the following dimensions (referring to FIG. 6):

TABLE 1

| | |
|---|---|
| $a_1$ (angle of front channel front face to horizontal) | 88.0° |
| $a_2$ (angle of front channel rear face to horizontal) | 52.5° |
| $b_1$ (angle of rear channel front face to horizontal) | 88.0° |
| $b_2$ (angle of rear channel rear face to horizontal) | 47.5° |
| c (distance from top of front channel rear face to collection lens centerline) | 0.872 in. |
| d (height of top of front channel rear face) | 4.880 in. |
| e (height of top of rear channel rear face) | 2.930 in. |
| f (distance from top of rear channel rear face to collection lens centerline) | 3.402 in. |

As seen in FIGS. 4 and 6, a vertical wall 138 surrounds the underside of optical structure 100. Channels 110 and 112 are inside the perimeter of wall 138, as is imaging lens 114. Upon assembly, optical structure 100 fits over access/support structure 14, with walls 138 of optical support structure 100 surrounding walls 16 of access/support structure 14.

Optical structure 100 is preferably molded as an integral component. Possible materials for optical structure 100 include clear polystyrene available from BASF Corporation of Mount Olive, N.J., grade 148G KG21; clear polystyrene available from Nova Chemicals Corporation of Moon Township, Pa., grade PS1300; LEXAN polycarbonate resin available from GE Plastics of Fairfield, Conn., grade 121R, color 1111; and MAKROLON polycarbonate resin available from Bayer Polymers of Pittsburgh, Pa., grade 2405, color 1000. Other possible materials include acrylic, cyclic olefin copolymer, SAN styrene blend and NAS styrene blend.

Imaging lens 114 includes upper and lower convex lenses $114_a$ and $114_b$. The refractive power and other optical properties of imaging lens 114 may vary based upon distance from image sensor 204, distance of image sensor 204 above the tracking surface, the specific design of image sensor 204, and other configuration choices. The determination of imaging lens optical requirements is within the routine ability of a person skilled in the art once provided with the descriptions herein and various design parameters. Similarly, the preferred refractive power and other optical properties of collection lens 120 may vary based on parameters such as size of LED 210, size of channels 110 and 112, distances from a target area, and other configuration choices. The determination of collection lens optical requirements is likewise within the routine ability of a person skilled in the art once provided with the descriptions herein and the relevant design parameters. In one preferred embodiment, collection lens 120 causes light emanating from channels 110 and 112 to be slightly out of focus. In this manner, light is more evenly spread onto the target area of the tracking surface.

FIG. 7 is a cross section of optical structure 100, access/support structure 14, PCB 200, image sensor 204 and LED 210 in an assembled condition. Channels 110 and 112 rest within and to the rear of first well 20 of access/support structure 14. Baffle 28 (which also prevents or minimizes stray light from reaching imaging lens 114), together with a beveled edge 30 on transmission hole 22, defines boundaries for an angled path for light from channels 110 and 112 to target area 34. Light exiting from front faces 124 and 130 of channels 110 and 112 shines upon and illuminates target area 34. The arrows showing target area 34 only approximate the location and extent of the target area for purposes of illustration. A portion of this light is then reflected upward from target area 34 through entrance hole 26 to imaging lens 114. Imaging lens 114 then collects and focuses this reflected light and directs it into aperture 220 of aperture plate 216. The light then passes through aperture 220 and reaches the photo-sensitive elements of image sensor 204.

As can also be appreciated from FIG. 7, optical structure 100 provides a unitary structure that positions LED 210 with respect to imaging lens 114 without reliance upon other structures.

Figure 8:
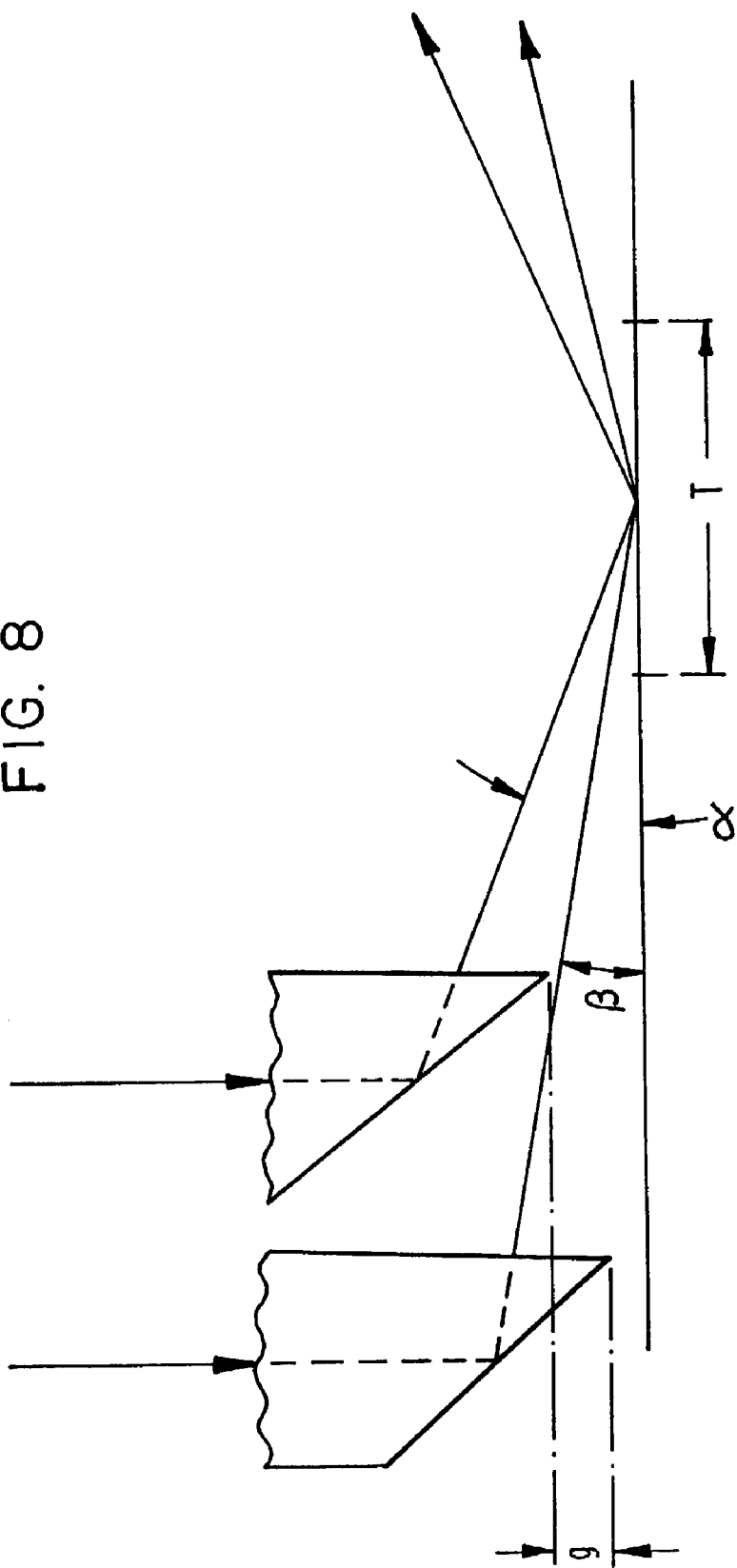
FIG. 8 is a schematic drawing showing operation of a multi-channel light guide according to one embodiment of the invention.
Figure 9:
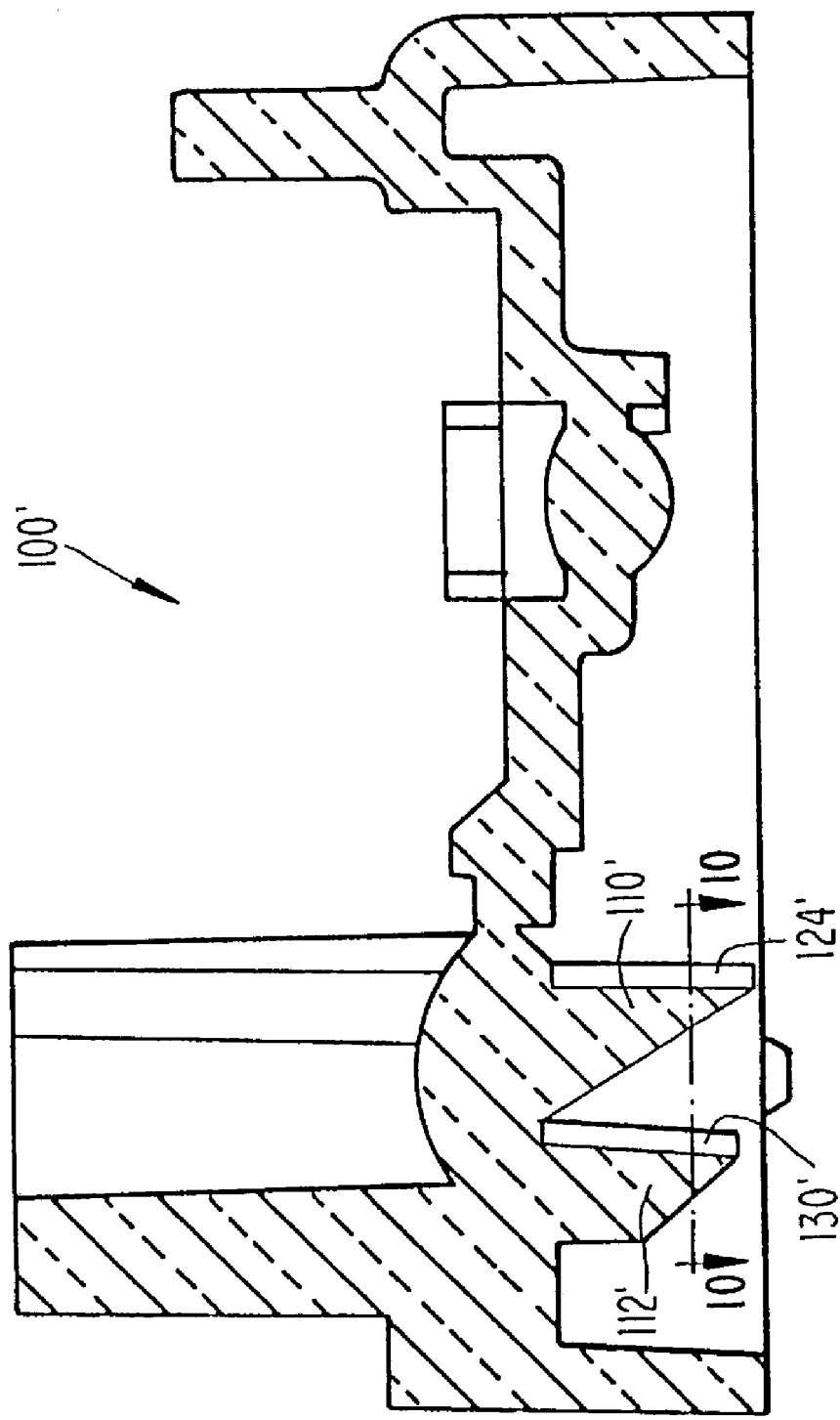
FIG. 9 is a cross section of an optical structure according to another embodiment of the invention.

FIG. 8 schematically shows operation of optical structure 100 and advantages provided over other systems for directing illumination to a target surface. In FIG. 8, the arrows generally show the directions in which most of the light is directed through channels 110 and 112. Because of scattering and other effects, however, there will also be light transmitted in other directions. Light from front channel 110 exits the front face 124 at a first angle α. Light exits the front face 130 of rear channel 112 at an angle β, which is shallower than angle α. There is a gap g between the lowest portion of channel 110 and the lowest portion of channel 112. Light from rear channel 112 and front channel 110 simultaneously illuminates the target area T. By illuminating from two different angles, light is more evenly distributed across the target area, and non-uniform illumination is reduced. Light can be divided between channels 110 and 112 in any proportion. Preferably, a majority of the light from LED 210 is directed into channel 110, and a smaller portion of light is directed into channel 112. In one preferred embodiment, channels 110 and 112 are formed such that approximately 80% of the target area illumination comes from front channel 110, and approximately 20% of the target area illumination comes from rear channel 112. In that embodiment, light is directed to the target area from the front channel at an angle of approximately 70° from the vertical (or approximately 20° from the horizontal). Light is directed to the target area from the rear channel at approximately 80° from the vertical (or approximately 10° from the horizontal). In other embodiments, approximately 50%–90% of light reaching the target area comes from front channel 110, and approximately 10%–40% of light reaching the target area comes from rear channel 112. In yet other embodiments, approximately 70%–90% of light reaching the target area comes from front channel 110, and approximately 10%–30% of light reaching the target area comes from rear channel 112. In still other embodiments, light is directed to the target area from the front channel at an angle of approximately 50°–85° from the vertical (or approximately 5°–40° from the horizontal), and light is directed to the target area from the rear channel at approximately 50°–85° from the vertical (or approximately 50–40° from the horizontal), although at a shallower angle than light from the front channel.

Figure 10:
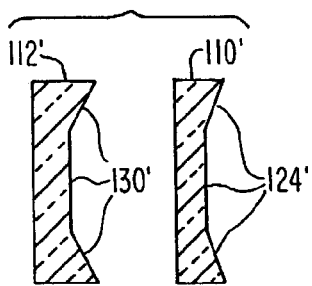
FIG. 10 is a cross section taken along lines 10—10 of FIG. 9.
Figure 11:
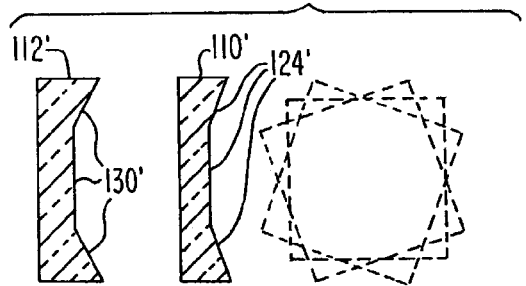
FIG. 11 is a drawing schematically showing light patterns from the optical structure of FIGS. 9 and 10.
Figure 13:
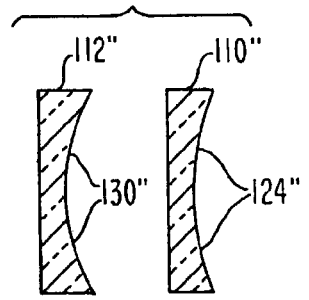
FIG. 13 is a cross section taken along lines 13—13 of FIG. 12.
Figure 14:
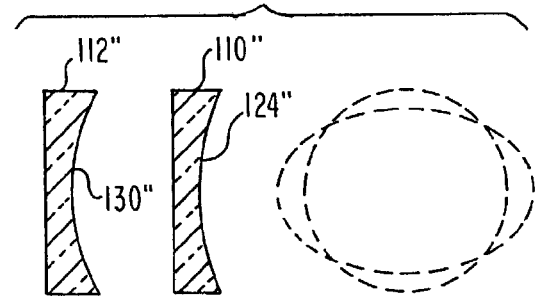
FIG. 14 is a drawing schematically showing light patterns from the optical structure of FIGS. 12 and 13.
Figure 15A:
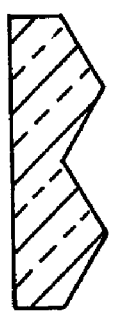
FIGS. 15A–15F are cross sections of a portion of an optical structure according to additional embodiments of the invention.
Figure 15B:
Figure 15C:
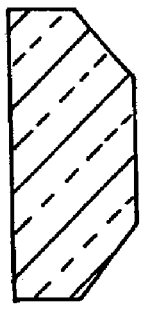
Figure 15D:
Figure 15E:
Figure 15F:

FIGS. 9–14 show additional embodiments of an optical structure 100' and 100". Optical structure 100' (FIG. 9) is substantially similar to optical structure 100 except for the configurations of front faces 124' and 130' of channels 110' and 112'. As shown in FIG. 10, a cross section taken along lines 10—10 of FIG. 9, the front faces 124' and 130' are not planar. Instead, each channel front face is faceted. In this manner, light can be more evenly distributed across the target area. FIG. 11 schematically shows light shined on a target area by front faces 124' and 130'. Each facet will generally direct most of its light to a portion of the target area, with those portions substantially overlapping. Because of scattering and other effects, however, some light is also transmitted in other directions and in regions outside of the general illumination patterns shown. As shown in FIG. 11, faceted front faces 124' and 130' do not shine all light in the same areas, but their illumination patterns do substantially overlap. To simplify FIG. 11, only three boxes are shown for the patterns caused by various facets, and not six boxes (one for each facet). Although channels 110' and 112' each has three facets, the number of facets can be varied. Optical structure 100" (FIG. 12) is also similar to optical structure 100 except for the shape of the front faces 124" and 130" of channels 110" and 112". In this embodiment, and as shown in FIG. 13, the front faces 124" and 130" are formed as curvilinear concave refractive surfaces. As shown in FIG. 14, front faces 124" and 130" are configured to spread light across the target area out of focus, i.e. over a larger spot size, thereby distributing light more evenly. The non-planar front face(s) of the channels could take other forms. For example, the front face of one or more of the channels could have a cross-section in a form such as is shown in one of FIGS. 15A through 15F. FIGS. 15A–15F are cross sections of a single channel taken in a location similar to that of line 10—10 in FIG. 9, with the proportions slightly exaggerated for clarity of illustration. FIGS. 15A–15C are examples of other forms of a faceted front face. FIG. 15D is an example of a curvilinear convex front face. FIG. 15E is an example of a combination faceted-concave front face. FIG. 15F is an example of a combination faceted-convex front face. In some embodiments, one front face may be planar and the other non-planar (whether faceted, convex, concave, combination convex-faceted or combination concave-faceted). In still other embodiments, one front face may be one type of non-planar face and another front face may be another type of non-planar face.

Figure 16:
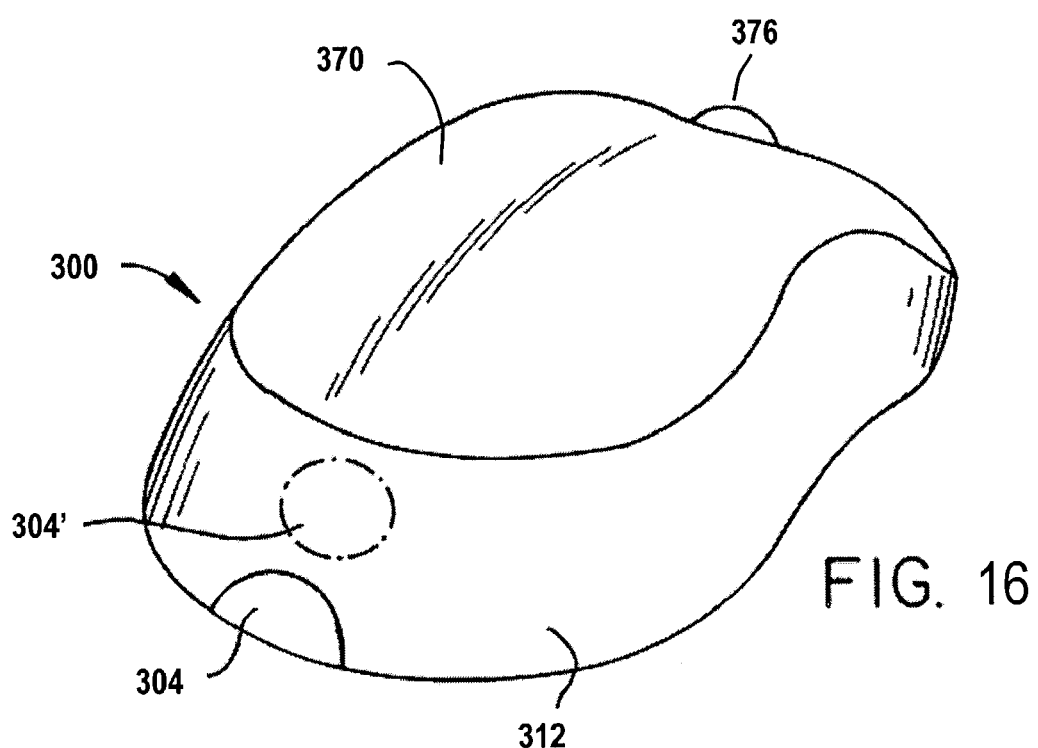
FIG. 16 is a rear perspective view of a computer mouse according to another embodiment of the invention.

FIG. 16 is a rear perspective view of a mouse 300 according to another embodiment of the invention. Mouse 300 is similar to mouse 10 of FIGS. 3–7, and includes an upper housing 370, a housing base 312, a scroll wheel 376 and buttons 372 and 374 (not shown in FIG. 16, but seen in FIG. 17). Mouse 300 further includes an externally-visible light window 304. Light window 304 may be transparent or translucent, and may also be color tinted. Window 304 is arranged so that light from an internal light source (as described more fully below) is visible to a mouse user when the lower housing 312 of mouse 300 rests upon a supporting surface. Window 304 could be located elsewhere on mouse 300; an example of a possible alternate location includes, but is not limited to, window 304'. In use, mouse 300 is connected to a computer (not shown) and provides signals to the computer to control a cursor or other screen image. Mouse 300 may communicate with and receive power from the computer via a wired connection (not shown), or may be wireless and receive power from a battery within mouse 1 (also not shown).

Figure 17:
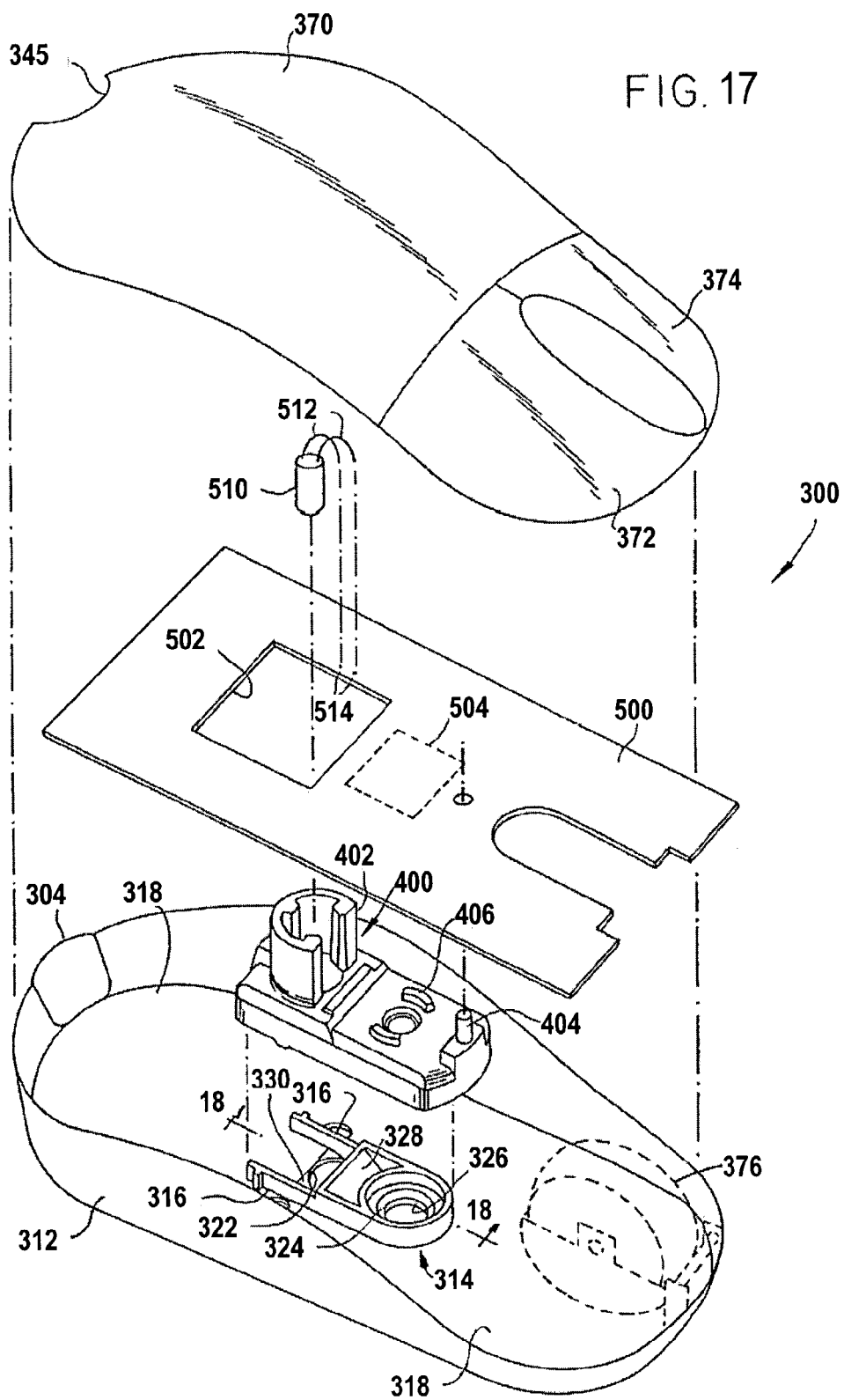
FIG. 17 is an "exploded" view of a computer mouse incorporating an optical structure according to another embodiment of the invention.
Figure 18:
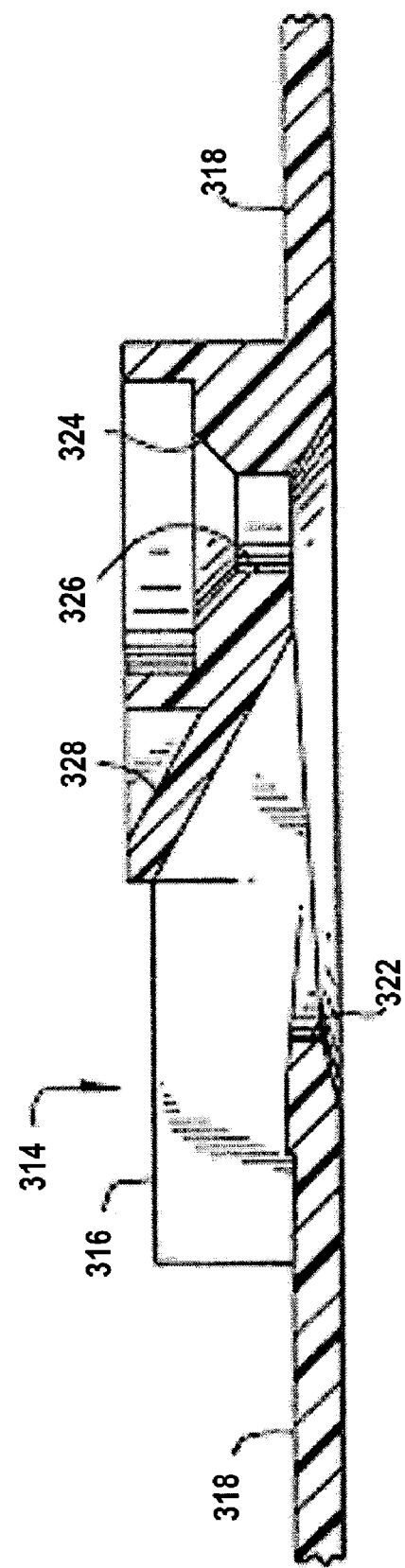
FIG. 18 is a cross section taken along lines 18—18 of FIG. 17.

FIG. 17 is an "exploded" view of portions of computer mouse 300. Except as set forth in more detail below, the features of mouse 300 shown in FIGS. 17–23 are similar to the features of mouse 10 shown in FIGS. 2–7. For convenience, each feature in FIGS. 17–23 has the same reference number as the analogous feature in FIGS. 2–7, except that 300 has been added (e.g., scroll wheel 376 in FIG. 17 is analogous to scroll wheel 76 in FIG. 2). Except where stated otherwise, the previous description of features of mouse 10 applies to the features of mouse 300. As seen in FIG. 17, and unlike mouse 10, walls 316 of access/support structure 314 are open at the end (see also FIG. 18, a cross-section of access/support structure 314 taken along lines 18—18 in FIG. 17). The opening between walls 316 faces window 304.

In one embodiment, window 304 is a transparent or translucent insert attached to housing base 312, housing base 312 being otherwise opaque. Window 304 fits into a cutout 345 in upper housing 370 when mouse 300 is assembled. In other embodiments, window 304 could be located entirely within upper housing 370. Upper housing 370 may have one or more buttons 372, 374, an opening for a scroll wheel 376, and/or other mechanisms for receiving user input. Mouse 300 would typically include numerous other components such as a battery (if mouse 300 is wireless), various connectors, cabling, etc. So as not to obscure the drawings with unnecessary detail, these additional components are not shown, but would be understood as present by persons skilled in the art.

Figure 19:
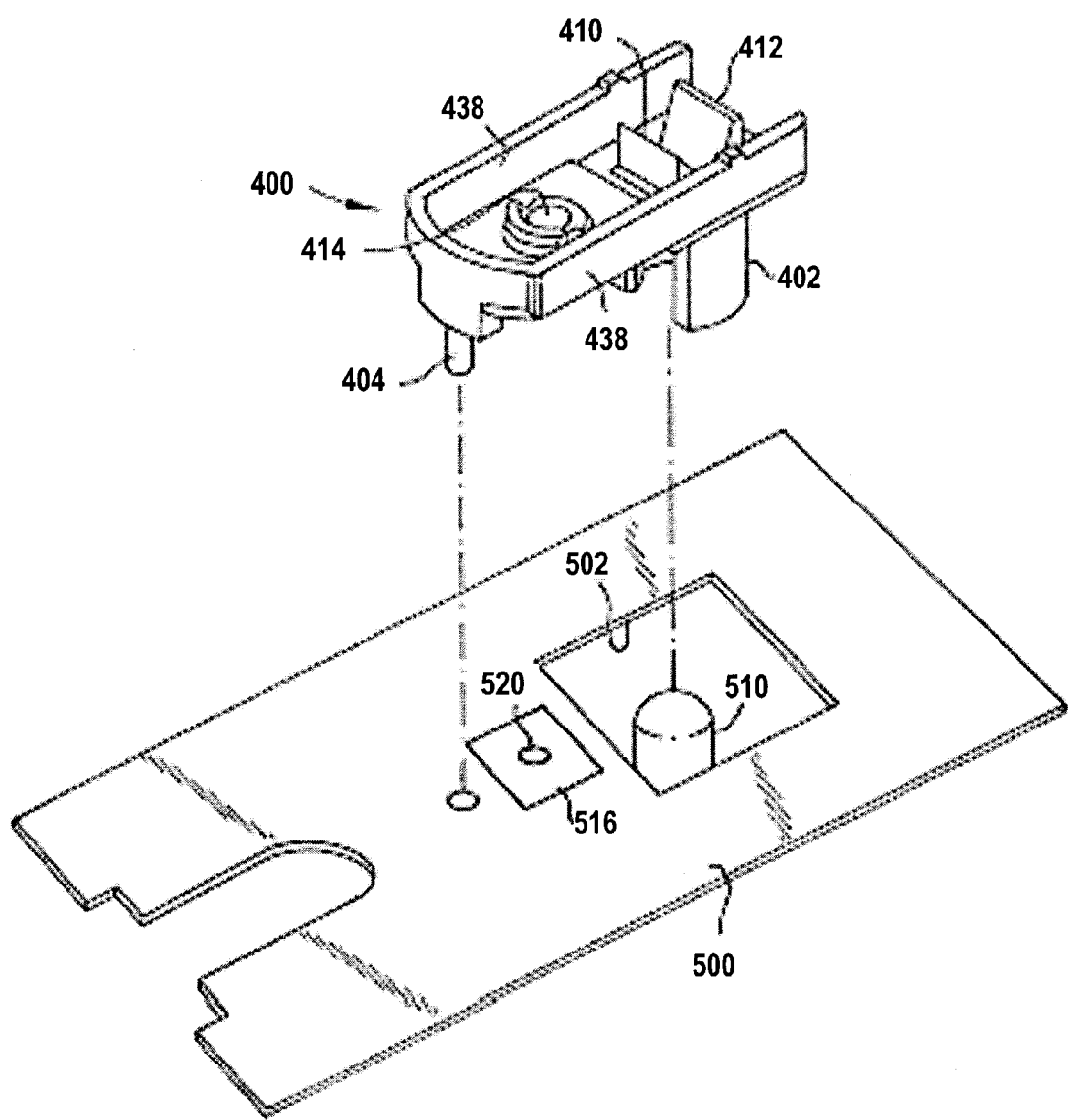
FIG. 19 is an inverted "exploded" partial view of the computer mouse of FIG. 17.

As with optical structure 100 of mouse 100, optical structure 400 of mouse 300 fits over access/support structure 314. As shown in FIG. 19, however, optical structure 400 differs from optical structure 100. As seen in FIG. 19 (which is similar to FIG. 17 but inverted so as to expose the underside of PCB 500 and optical structure 400), light guide channels 410 and 412 face in opposite directions. Moreover, wall 438 is open at one end.

Figure 20:
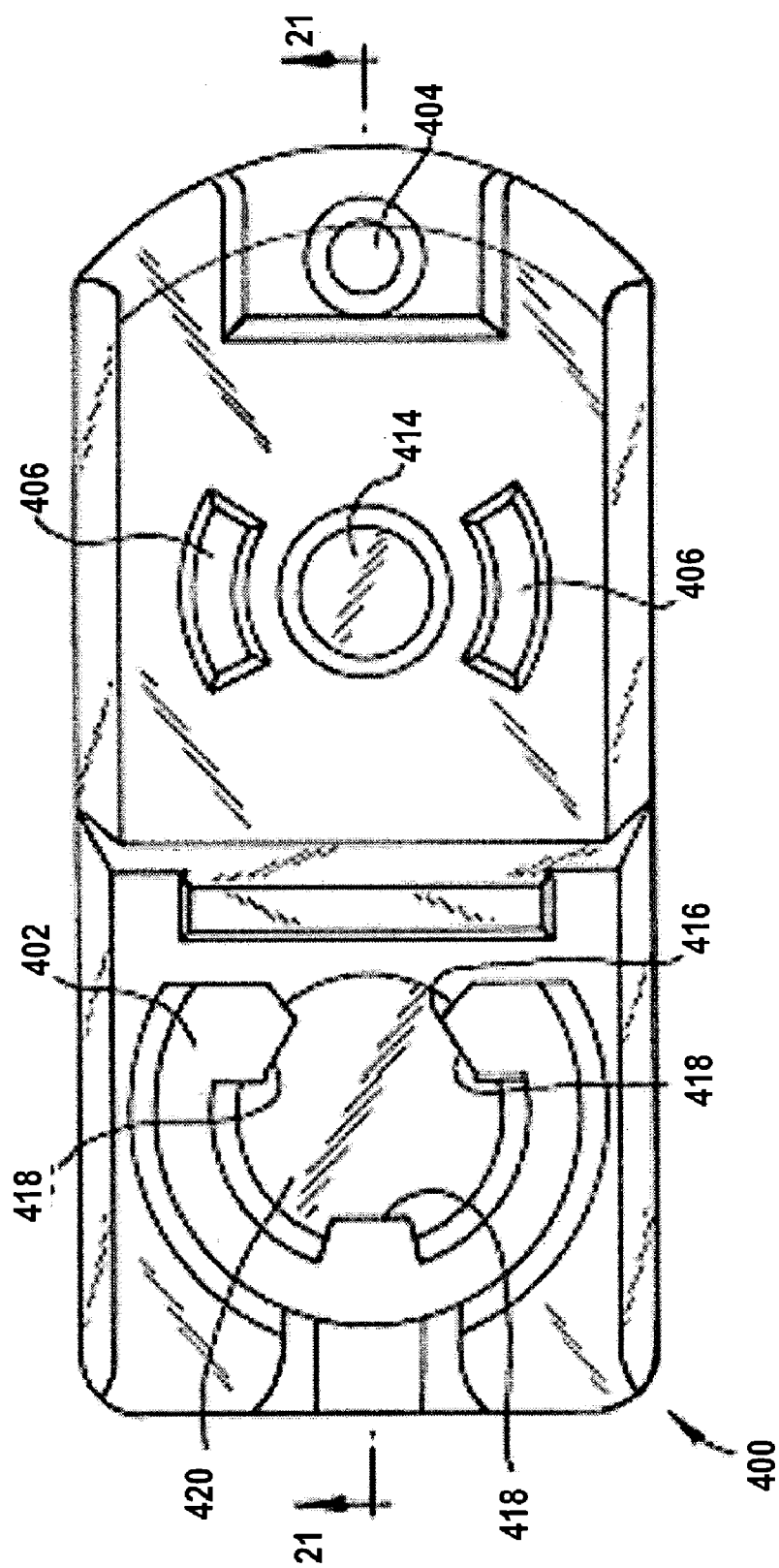
FIG. 20 is a top view of an optical structure according to another embodiment of the invention.
Figure 21:
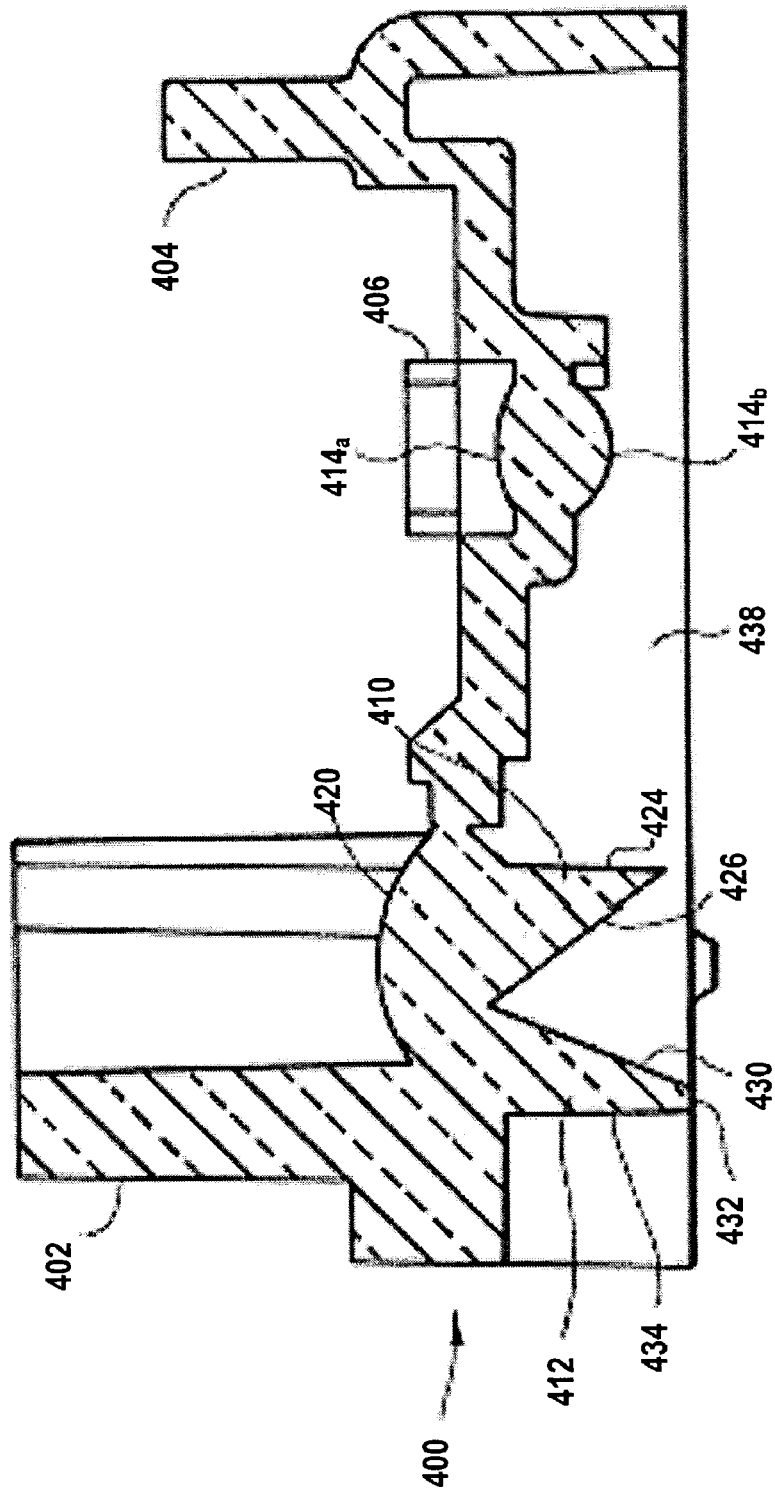
FIG. 21 is a cross section taken along lines 21—21 of FIG. 20.
Figure 22:
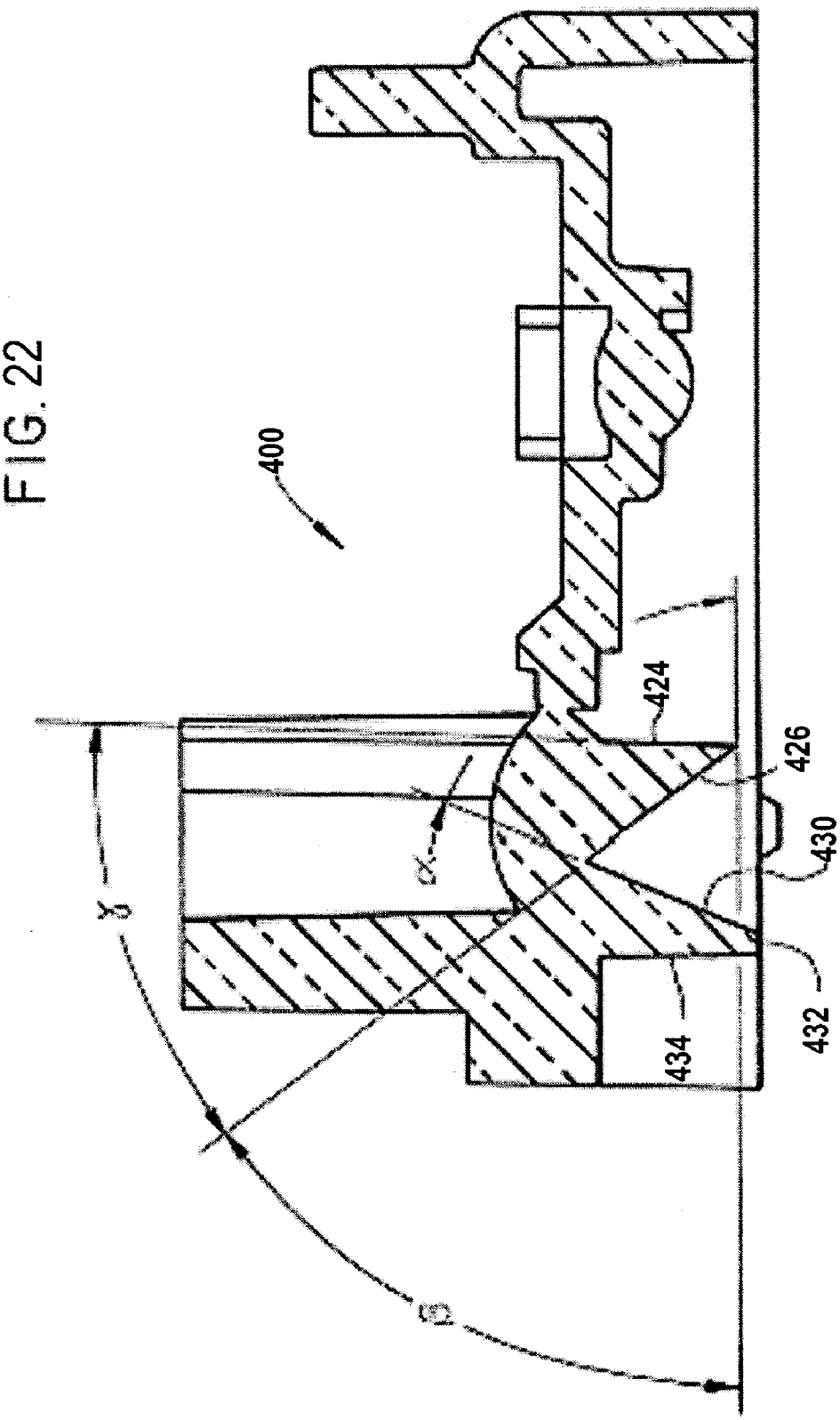
FIG. 22 is another cross section similar to that of FIG. 21, but with various angles labeled.

FIGS. 20 and 21 show optical structure 400 in more detail. FIG. 20 is a top view of optical structure 400, and is similar to FIG. 5. FIG. 21 is a cross section of optical structure 400 taken along lines 21—21 of FIG. 20. Upon assembly, LED 510 is positioned inside the cylinder of LED support 402 and pointing vertically downward. Three vertical locating ridges 418 are formed inside of LED support 402 and serve to align LED 510. Formed in the bottom of LED support 402 is a collection lens 420. Collection lens 420 collects light emitted by LED 510 and directs that light to the tracking surface target area via channel 410 and to window 304 via channel 412. Also formed in optical structure 400 is an imaging lens 414. Imaging lens 414 collects and focuses light reflected from a target area and directs that light through aperture 511 in aperture plate 520.

Light from LED 510 strikes the upper surface of collection lens 420 and is divided between channels 410 and 412. The portion divided into channel 410 is used to illuminate a target area for imaging by image sensor 504. Channel 410 has an exit face 424 and a reflecting face 426. Reflecting face 426 forms a Total Internal Reflecting (TIR) surface. Light travels through channel 410 and strikes the TIR surface of reflecting face 426. The light is then reflected by the TIR surface of reflecting face 426 and exits channel 410 through exit face 424. Another portion of the light emitted by LED 510 and entering collection lens 420 is diverted to channel 412. This diverted light is then reflected by a TIR surface of reflecting face 430 of channel 412, and exits channel 412 through exit face 434. Reflecting face 430 and exit face 434 may be separated by a horizontal face 432. Light divided into channel 412 is used for illuminating window 304. Channels 412 and 410 are separated by a space bounded by the reflecting face 426 of channel 410 and by reflecting face 430 of channel 412. Upon assembly, the open end of optical structure 400 aligns with the opening between walls 316 of access/support structure 314 so as to allow light from exit face 434 to reach window 304. Channels 410 and 412 rest between walls 316 and within well 320.

Like optical structure 100 of FIGS. 2–7, optical structure 400 is preferably molded as an integral component. Possible materials for optical structure 400 include clear polystyrene available from BASF Corporation of Mount Olive, N.J., grade 148G KG21; clear polystyrene available from Nova Chemicals Corporation of Moon Township, Pa., grade PS1300; LEXAN polycarbonate resin available from GE Plastics of Fairfield, Conn., grade 121R, color 1111; and MAKROLON polycarbonate resin available from Bayer Polymers of Pittsburgh, Pa., grade 2405, color 1000. Other possible materials include acrylic, cyclic olefin copolymer, SAN styrene blend and NAS styrene blend.

Imaging lens 414 includes upper and lower convex lenses $414_a$ and $414_b$. The refractive power and other optical properties of imaging lens 414 may vary based upon distance from image sensor 504, distance of image sensor 504 above the tracking surface, the specific design of image sensor 504, and other configuration choices. The determination of imaging lens optical requirements is within the routine ability of a person skilled in the art once provided with the descriptions herein and various design parameters. Similarly, the preferred refractive power and other optical properties of collection lens 420 may vary based on parameters such as size of LED 510, size of channels 410 and 412, distances from a target area, desired output illumination through window 304, and other configuration choices. The determination of collection lens optical requirements is likewise within the routine ability of a person skilled in the art once provided with the descriptions herein and the relevant design parameters.

In one embodiment, approximately 80% of light entering collecting lens 420 is directed to channel 410, and approximately 20% of the light entering collecting lens 420 is directed to channel 412. In that embodiment, angle α (FIG. 22) is approximately 67.5°, angle β is approximately 52° and angle γ is approximately 90°(β+2)°. In other embodiments, approximately 70%–90% of light entering collecting lens 420 is directed to channel 410, and approximately 10%–30% of light entering collecting lens 420 is directed to channel 412. In another embodiment similar to that shown in FIG. 17, angle α is approximately 55°. Angle α may generally be between approximately 45° and 70°, depending on LED (or other light source) height, angle of face 434 with the vertical, distance to the window to be illuminated and height of the window.

Figure 23:
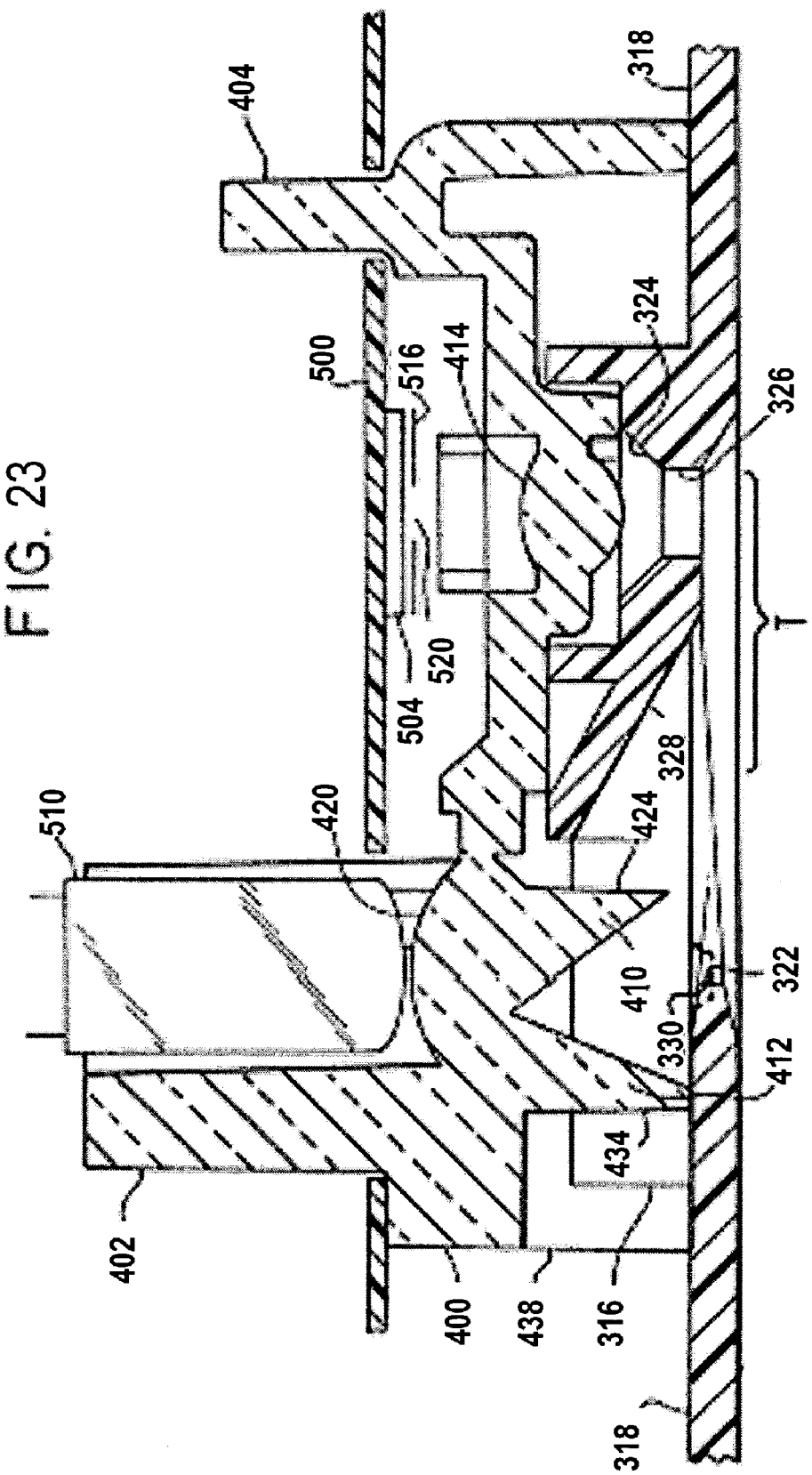
FIG. 23 is a cross section of an optical structure shown in FIG. 21 when assembled with other components.

FIG. 23 is a cross section of optical structure 400, access/support structure 314, PCB 500, image sensor 504 and LED 510 in an assembled condition. Channels 412 and 410 rest between walls 316 of access/support structure 314. Baffle 328, together with a beveled edge 330 on transmission hole 322, define boundaries for an angled path for light from channel 410 to target area T. The bracket above the "T" in FIG. 23 only approximates the location and extent of the target area for purposes of illustration. Baffle 328 also prevents or minimizes stray light from reaching imaging lens 414. Light exiting from exit face 424 of channel 410 shines upon and illuminates target area T. A portion of this light is then reflected upward from target area T through entrance hole 326 to imaging lens 414. Imaging lens 414 then collects and focuses this reflected light and directs it into aperture 520 of aperture plate 516. The light then passes through aperture 520 and reaches the photo-sensitive elements of image sensor 504. Light exiting from exit face 434 of channel 412 shines upon window 304 and is visible to a user of mouse 300 while mouse 300 rests upon a supporting surface.

In the embodiments of FIGS. 17–23, light generally exits from faces 424 and 434 in directions that are approximately 180° apart in the horizontal plane (e.g., the plane of the bottom housing 318 in FIG. 23). In other embodiments, light from exit faces 424 and 434 may be separated by other angles. For example, and referring to FIG. 16, alternate location 304' could instead be located on (or toward) one of the sides of mouse 300. Access/support structure 314 could be modified as necessary to allow direction of light to a window not directly behind optical structure 400. Light from exit face 434 could also be directed upward or downward by modification of channel 412.

Figure 24:
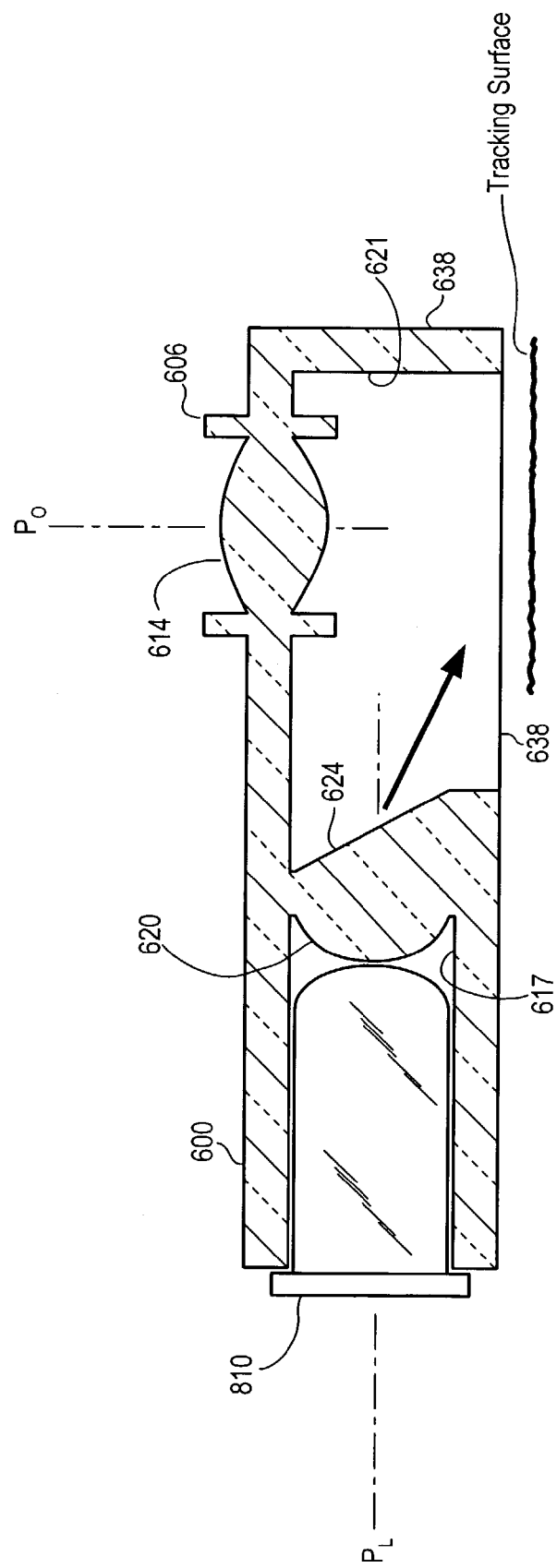
FIG. 24 is a cross section of an optical structure according to a further embodiment of the invention.
Figure 25:
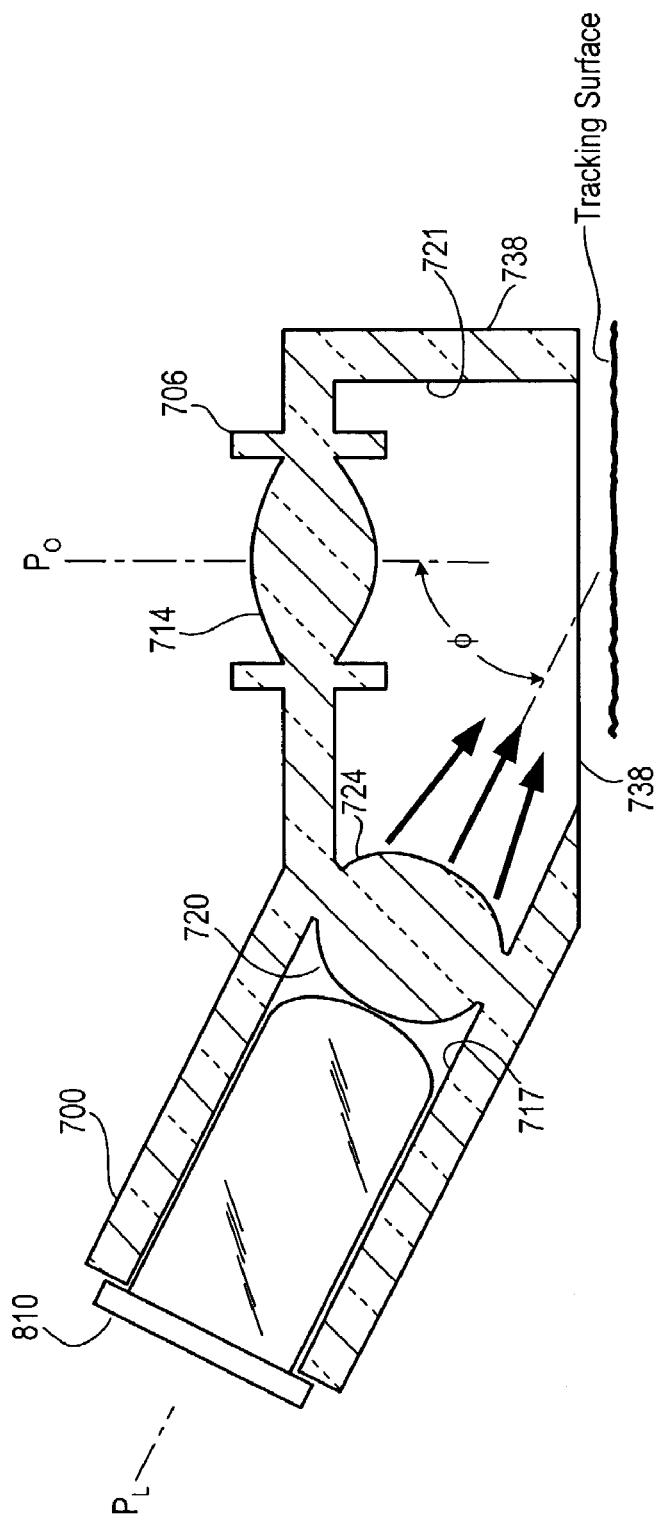
FIG. 25 is a cross section of an optical structure according to yet another embodiment of the invention.

FIGS. 24 and 25 show cross sections of optical structures according to alternate embodiments of the invention. FIG. 24 is a cross section of an optical structure 600 taken along a lengthwise centerline, similar to the cross sections shown in FIGS. 6, 7, 9, 12 and 21–23. The LED support structure of optical structure 600 does not extend in a direction parallel to an optical axis of the imaging lens, as shown in prior embodiments. Instead, the support structure includes a cavity 617 formed in an end of optical structure 600, and LED 810 is inserted into that cavity. Although a rim is shown around an end of LED 810, an optical structure such as optical structure 600 could alternatively accept a LED without such a rim. In the embodiment of FIG. 24, the LED longitudinal axis $P_L$ is perpendicular to an optical axis $P_O$ of the imaging lens 614. Formed at the end of cavity 617 is a collection lens 620. Opposite collection lens 620 is an exit face 624. Although exit face 624 is formed as a planar surface, face 624 could instead be a convex refractive surface or have other shapes. As shown by the bold arrow in FIG. 24, light from LED 810 is refracted from exit face 624 toward a tracking surface (e.g., desk top or other supporting surface of an optical mouse). Light is then reflected by surface roughness of the tracking surface at various angles (not shown) toward imaging lens 614. Similar to prior embodiments, optical structure 600 may have one or more spacer/shield walls 606, a positioning post (not shown) and one or more vertical walls 638. The open region 621 within vertical walls 638 and under imaging lens 614 could cooperate with a modified access/support structure (not shown) formed on the interior of a computer mouse.

FIG. 25 is a cross section of an optical structure 700, also taken along a lengthwise centerline similar to the cross sections shown in FIGS. 6, 7, 9, 12 and 21–23. Similar to optical structure 600 of FIG. 24, optical structure 700 does not position a LED such that the longitudinal axis of the LED is parallel to an optical axis of the imaging lens. Instead, an end of optical structure 700 is angled upward to form a LED support structure, with LED 810 resting within cavity 717. An optical structure such as optical structure 700 could alternatively accept a LED without a rim. In the embodiment of FIG. 25, the LED longitudinal axis $P_L$ is at an angle $\Phi$ to optical axis $P_O$ of the imaging lens 714. In one embodiment, $\Phi$ is approximately 60°. Formed at the end of cavity 717 is a collection lens 720. Opposite collection lens 720 is an exit face 724. Although exit face 724 is formed as a convex refractive surface, face 724 could instead be planar or have other shapes. As shown by the bold arrows in FIG. 25, light from LED 810 is directed from exit face 624 toward a tracking surface, and is then reflected by surface roughness at various angles (not shown) toward imaging lens 714. Similar to prior embodiments, optical structure 700 may have one or more spacer/shield walls 706, a positioning post (not shown) and one or more vertical walls 738. The open region 721 within vertical walls 738 and under imaging lens 714 could cooperate with a modified access/support structure (not shown) formed on the interior of a computer mouse.

As can be appreciated from the above description, an integral lens and light holder according to the invention provides numerous advantages over the prior art. Instead of separate structures for mounting and aligning a LED and for focusing and directing reflected light, a single structure is provided. Because only a single structure is needed, overall costs are reduced. Moreover, reducing the number of pieces permits close tolerances to be more easily maintained during assembly. Although several examples of carrying out the invention have been described, those skilled in the art will appreciate that there are numerous variations and permutations of the above described examples that fall within the spirit and scope of the invention. As but one example, a unitary lens and light source holder according to the invention need not be used in conjunction with a corresponding support structure such as access/support structures 14 or 314. Numerous other configurations are possible. As but one other example, more or less than two channels could be implemented. One, some or all of the additional channels could also have a non-planar front face. These and other modifications are within the scope of the invention, which is only limited by the attached claims.

The invention claimed is:

1. An imaging lens unit for use in conjunction with an optical sensor, comprising:
   a body portion;
   an imaging lens formed as an integral part of the body portion, the imaging lens having an optical axis; and
   a light source support fixture formed as an integral part of the body portion, and wherein the support fixture
      is configured to support a light source in a desired spatial relationship with respect to the imaging lens,
      has an opening for insertion of the light source into the support fixture along an installation axis,
      is configured to prevent removal of the light source along substantially all other axes, and
      extends from the body portion in a direction substantially parallel to and offset from the optical axis.

2. The imaging lens unit of claim 1, wherein the support fixture comprises an integral collection lens.

3. The imaging lens unit of claim 1, wherein the imaging lens unit is molded from one of polycarbonate, polystyrene, acrylic, cyclic olefin copolymer, SAN styrene blend and NAS styrene blend.

4. The imaging lens unit of claim 1, wherein the imaging lens includes an optical axis and wherein the installation axis is substantially perpendicular to the optical axis.

5. An imaging lens unit for use in conjunction with an optical sensor, comprising:
   a body portion;
   an imaging lens formed as an integral part of the body portion; and
   a light source support fixture formed as an integral part of the body portion, and wherein the support fixture
      is configured to support a light source in a desired spatial relationship with respect to the imaging lens,
      has an opening for insertion of the light source into the support fixture along an installation axis,
      is configured to prevent removal of the light source along substantially all other axes,
      is substantially columnar in shape,
      has a cavity formed therein, and
      further comprises a plurality of locating ridges disposed about the periphery of the cavity configured to position the light source into a predetermined position.

6. An imaging lens unit for use in conjunction with an optical sensor, comprising:
   a body portion;
   an imaging lens formed as an integral part of the body portion; and
   a light source support fixture formed as an integral part of the body portion, and wherein the support fixture is configured to support a light source in a desired spatial relationship with respect to the imaging lens,
has an opening for insertion of the light source into the support fixture along an installation axis,
is configured to prevent removal of the light source along substantially all other axes,
is substantially columnar in shape,
has a cavity formed therein, and
has a lengthwise opening along a substantial part of the support fixture length, the lengthwise opening being sized to prevent passage of the light source therethrough.

7. An imaging lens unit for use in conjunction with an optical sensor, comprising:
a body portion;
an imaging lens formed as an integral part of the body portion;
at least one integral locating extension for positioning the imaging lens with respect to an image sensor; and
a light source support fixture formed as an integral part of the body portion, and wherein the support fixture
is configured to support a light source in a desired spatial relationship with respect to the imaging lens,
has an opening for insertion of the light source into the support fixture along an installation axis, and
is configured to prevent removal of the light source along substantially all other axes.

8. The imaging lens unit of claim 7, wherein the imaging lens includes an optical axis and wherein the at least one integral locating extension is configured to position the imaging lens a designated distance from the image sensor along the optical axis.

9. An imaging lens unit for use in conjunction with an optical sensor, comprising:
a body portion;
an imaging lens formed as an integral part of the body portion;
an integral light guide for directing light from the light source to a reflecting position, the reflecting position being situated such that a reflecting surface in the reflecting position will reflect the directed light into the imaging lens; and
a light source support fixture formed as an integral part of the body portion, and wherein the support fixture
is configured to support a light source in a desired spatial relationship with respect to the imaging lens,
has an opening for insertion of the light source into the support fixture along an installation axis, and
is configured to prevent removal of the light source along substantially all other axes.

10. An imaging lens unit for use in conjunction with an optical sensor, comprising:
a body portion;
an imaging lens formed as an integral part of the body portion, the imaging lens having an optical axis; and
a light source support fixture formed as an integral part of the body portion, and wherein the support fixture
is configured to support a light source in a desired spatial relationship with respect to the imaging lens,
has an opening for insertion of the light source into the support fixture along an installation axis, the installation axis being at an angle to the optical axis, said angle being approximately 60°, and
is configured to prevent removal of the light source along substantially all other axes.

11. An imaging lens unit for use in conjunction with an optical sensor, comprising:
a body portion;
an imaging lens formed as an integral part of the body portion; and
a light source support formed as an integral part of the body portion, and wherein the light source support is configured to receive the light source,
configured to support, without additional cooperating structure, a light source in a desired orientation to the imaging lens,
laterally displaced from the imaging lens, and
is configured to retain, without additional cooperating structure, the light source in the desired orientation to the imaging lens.

12. The imaging lens unit of claim 11, wherein the imaging lens includes an optical axis and wherein the light source support extends from the body portion in a direction substantially parallel to and offset from the optical axis.

13. The imaging lens unit of claim 11, wherein the light source support is substantially columnar in shape.

14. The imaging lens unit of claim 13, wherein the light source support has a cavity formed therein, and wherein the light source support further comprises a plurality of locating ridges disposed about the periphery of the cavity configured to position the light source into a predetermined position.

15. The imaging lens unit of claim 13, wherein the light source support has a cavity formed therein, and wherein the light source support further has lengthwise opening along a substantial part of the light source support length, the lengthwise opening being sized to prevent passage of the light source therethrough.

16. The imaging lens unit of claim 11, further comprising at least one integral locating extension for positioning the imaging lens with respect to an image sensor.

17. The imaging lens unit of claim 16, wherein the imaging lens includes an optical axis and wherein the at least one integral locating extension is configured to position the imaging lens a designated distance from the image sensor along the optical axis.

18. The imaging lens unit of claim 11, wherein the light source support comprises an integral collection lens.

19. The imaging lens unit of claim 11, further comprising an integral light guide for directing light from the light source to a reflecting position, the reflecting position being situated such that a reflecting surface in the reflecting position will reflect the directed light into the imaging lens.

20. The imaging lens unit of claim 11, wherein the imaging lens unit is molded from one of polycarbonate, polystyrene, acrylic, cyclic olefin copolymer, SAN styrene blend and NAS styrene blend.

21. The imaging lens unit of claim 11, wherein the imaging lens includes an optical axis and wherein the light source support comprises a cavity formed in the body portion, the cavity extending in a direction substantially perpendicular to the optical axis.

22. The imaging lens unit of claim 11, wherein the imaging lens includes an optical axis and wherein the light source support comprises a cavity formed in the body portion, the cavity extending in a direction that is at an angle to the optical axis, the angle being approximately 60°.

23. A computer mouse, comprising:
a housing having
a housing base, the housing base having a lower surface configured for contact with and to move across a supporting surface, the lower surface having an imaging region through which light may be transmitted and received, and
an upper housing coupled to the housing base;

a light source contained within the housing;

an image sensor contained within the housing and positioned to receive light from the light source after the light has emanated from and then been reflected back through the imaging region; and an imaging lens unit having a body portion, an imaging lens formed as an integral part of the body portion and positioned in an optical path between the image sensor and the imaging region, and a light source support formed as an integral part of the body portion, wherein the light source support is configured to receive the light source, configured to support, without additional cooperating structure, a light source in a desired orientation to the imaging lens, laterally displaced from the imaging lens, and configured to retain, without additional cooperating structure, the light source in the desired orientation to the imaging lens.

24. The computer mouse of claim 23, wherein the imaging lens includes an optical axis and wherein the light source support extends from the body portion in a direction substantially parallel to and offset from the optical axis.

25. The computer mouse of claim 23, wherein the light source support is configured to hold the light source in a substantially perpendicular orientation with respect to the lower surface.

26. The computer mouse of claim 23, wherein the light source support is substantially columnar in shape.

27. The computer mouse of claim 26, wherein the light source support has a cavity formed therein, and wherein the light source support further comprises a plurality of locating ridges disposed about the periphery of the cavity configured to position the light source into a predetermined position.

28. The computer mouse of claim 26, wherein the light source support has a cavity formed therein, and wherein the light source support further has lengthwise opening along a substantial part of the light source support length, the lengthwise opening being sized to prevent passage of the light source therethrough.

29. The computer mouse of claim 23, further comprising at least one integral locating extension for positioning the imaging lens with respect to the image sensor.

30. The computer mouse of claim 29, wherein the imaging lens includes an optical axis and wherein the at least one integral locating extension is configured to position the imaging lens a designated distance from the image sensor along the optical axis.

31. The computer mouse of claim 23, wherein the light source support comprises an integral collection lens.

32. The computer mouse of claim 23, wherein the imaging lens unit further includes an integral light guide for directing light from the light source through the imaging region to a reflecting position on the supporting surface, the reflecting position being situated such that a portion of the supporting surface in the reflecting position will reflect the directed light into the imaging lens.

33. The computer mouse of claim 32, further comprising an illumination window formed in the housing in a position visible to a mouse user when the lower surface is in contact with a supporting surface, and wherein the imaging lens unit further includes an integral light guide for transmitting a portion of the light from the light source to the illumination window.

34. The computer mouse of claim 23, wherein the imaging lens unit is molded from one of polycarbonate, polystyrene, acrylic, cyclic olefin copolymer, SAN styrene blend and NAS styrene blend.

35. The computer mouse of claim 23, further comprising a printed circuit board having a first face on which the imaging sensor is mounted and a second face opposite the first face, wherein the imaging lens confronts the first face, and wherein the light source support extends through the printed circuit board so as to extend beyond the second face.

36. The computer mouse of claim 35, wherein the imaging lens unit further includes at least one extension protruding in a direction substantially opposite to a direction from which the light source support extends from the body portion, the extension configured to cooperate with a corresponding extension on an inner surface of the housing base so as to locate the imaging lens in a desired spatial relationship with the imaging region.

37. The computer mouse of claim 23, wherein the light source support is configured to hold the light source in a substantially parallel orientation with respect to the lower surface.

38. The computer mouse of claim 23, wherein the light source support is configured to hold the light source at an angle of approximately 30° with respect to the lower surface.

* * * * *